United States Patent
Shinomiya et al.

(10) Patent No.: US 7,558,284 B2
(45) Date of Patent: Jul. 7, 2009

(54) NETWORK DESIGN DEVICE

(75) Inventors: Norihiko Shinomiya, Kawasaki (JP);
Akira Chugo, Kawasaki (JP); Keiji Miyazaki, Kawasaki (JP); Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 11/098,712

(22) Filed: Apr. 4, 2005

(65) Prior Publication Data

US 2005/0220136 A1    Oct. 6, 2005

Related U.S. Application Data

(63) Continuation of application No. PCT/JP03/12510, filed on Sep. 30, 2003.

(30) Foreign Application Priority Data

Mar. 31, 2003   (WO) ................. PCT/JP03/04099

(51) Int. Cl.
*H04J 3/16* (2006.01)
(52) U.S. Cl. ........................... 370/437; 398/37
(58) Field of Classification Search .............. 370/437; 398/37; 359/124; 703/2
See application file for complete search history.

(56) References Cited

U.S. PATENT DOCUMENTS

| 5,392,147 A | 2/1995 | Kaede et al. | |
| 5,467,213 A | 11/1995 | Kaede et al. | |
| 6,842,723 B2 * | 1/2005 | Alicherry et al. ............... | 703/2 |
| 7,330,652 B1 * | 2/2008 | Maxham ....................... | 398/37 |
| 2003/0099014 A1 * | 5/2003 | Egner et al. .................. | 359/124 |

FOREIGN PATENT DOCUMENTS

| EP | 1 011 217 | 6/2000 |
| JP | 5-110517 | 4/1993 |
| JP | 5-292040 | 11/1993 |
| JP | 11-122258 | 4/1999 |
| JP | 11-340922 | 12/1999 |
| JP | 2000-183824 | 6/2000 |

OTHER PUBLICATIONS

International Search Report dated Nov. 25, 2003.
Michinobu Ohata, et al. 10 G Optical Transmission System. Hikari Denso System, Fujitsu, vol. 48, No. 5 Sep. 10, 1997 pp. 376-380.
P. Arijs et al. Design of Ring and Mesh Based WDM Transport Networks. Optical Networks Magazine, Jul. 2000 pp. 25-40.

* cited by examiner

*Primary Examiner*—Chi H Pham
*Assistant Examiner*—Albert T Chou
(74) *Attorney, Agent, or Firm*—Katten Muchin Rosenman LLP

(57) ABSTRACT

A network design device includes: a division section for dividing a network having a plurality of channels and branch nodes into a plurality of linear partial networks using a predetermined terminating node or each branch node as the terminating nodes by allocating a device terminating one or more channels to be used to the terminating node and each branch node; an allocation unit for allocating a linear relay device and/or a reproduction relay device to a node constituting each partial networks to which a device has been allocated by the allocation unit; and a deletion unit for deleting a device terminating the channel allocated to the branch node for each path formed by the path formation unit according to the signal performance.

12 Claims, 31 Drawing Sheets

FIG. 5

| LINK ID | NODE ID1 | NODE ID2 | LENGTH (km) | FIBER TYPE |
|---|---|---|---|---|
| L1 | N1 | N2 | 331 | SMF |
| L2 | N3 | N5 | 185 | NZ-DSF |
| ... | ... | ... | ... | ... |
| Lx | N10 | N12 | 169 | SMF |

FIG. 6

| NODE ID | LATITUDE | LONGITUDE |
|---------|----------|-----------|
| N 1 | 4 1. 1 0 | − 8 1. 5 0 |
| N 2 | 3 3. 7 2 | − 1 1 7. 9 0 |
| ... | ... | ... |
| N x | 4 7. 6 2 | − 8 9. 9 7 |

FIG. 7

| DEMAND ID | STARTING POINT | TERMINATING POINT | BANDWIDTH | NUMBER OF CHANNELS |
|---|---|---|---|---|
| D1 | N1 | N3 | OC-48 | 1 |
| D2 | N2 | N5 | OC-192 | 2 |
| ... | ... | ... | ... | ... |
| Dx | N10 | N13 | OC-192 | 1 |

FIG. 8

| FIBER TYPE | NUMBER OF MULTIPLEXING | FIBER LOSS | SIGNAL TO NOISE RATIO |
|---|---|---|---|
| SMF | 176 | 1 5 | 0. 1 5 0 |
| | | 1 6 | 0. 1 6 0 |
| | | 1 7 | 0. 1 7 0 |
| | | ... | ... |
| | 8 8 | ... | ... |
| | 4 4 | ... | ... |
| | ... | ... | ... |
| NZ-DSF | 176 | 1 5 | 0. 1 3 0 |
| | | 1 6 | 0. 1 4 0 |
| | | 1 7 | 0. 1 5 0 |
| | | ... | ... |
| | 8 8 | ... | ... |
| | 4 4 | ... | ... |
| | ... | ... | ... |
| ... | ... | ... | ... |

FIG. 9

| PATH ID | PATH ROUTE (NODE SERIES) | NODE WITH REGENERATOR |
|---|---|---|
| P1 | N1, N2 | NONE |
| P2 | N1, N2, N3, N6 | N2 |
| ... | N1, N2, N5, N8 | N5 |
| Px | N9, N6, N3, N2, N1 | N6, N2 |

FIG. 11

| SECTION | NOISE |
| --- | --- |
| TERMINAL NODE 1 — NODE 5 | 0.40dB |
| NODE 5 — NODE 6 | 0.40dB |
| NODE 6 — BRANCH NODE 4 | 0.40dB |
| BRANCH NODE 4 — NODE 7 | 0.40dB |
| NODE 7 — NODE 8 | 0.40dB |
| NODE 8 — TERMINAL NODE 2 | 0.40dB |
| BRANCH NODE 4 — NODE 9 | 0.40dB |
| NODE 9 — NODE 10 | 0.40dB |
| NODE 10 — TERMINAL NODE 3 | 0.40dB |

FIG. 16

| SECTION | NOISE |
|---|---|
| TERMINAL NODE 1 — NODE 5 | 0.40dB |
| NODE 5 — NODE 6 | 0.40dB |
| NODE 6 — BRANCH NODE 4 | 0.40dB |
| BRANCH NODE 4 — NODE 7 | 0.40dB |
| NODE 7 — NODE 8 | 0.40dB |
| NODE 8 — TERMINAL NODE 2 | 0.40dB |
| BRANCH NODE 4 — NODE 9 | 0.40dB |
| NODE 9 — NODE 10 | 0.40dB |
| NODE 10 — TERMINAL NODE 3 | 0.40dB |
| TERMINAL NODE 1 — NODE 22 | 0.80dB |
| NODE 22 — NODE 23 | 0.80dB |
| NODE 23 — NODE 24 | 0.80dB |
| NODE 24 — TERMINAL NODE 3 | 0.80dB |

FIG.24

SITE INFORMATION

| SITE ID | LATITUDE | LONGITUDE |
|---------|----------|-----------|
| N1 | 41.10 | -81.50 |
| N2 | 33.72 | -117.90 |
| ... | ... | ... |
| Nx | 47.62 | -89.97 |

FIG.25

FIBER SPAN INFORMATION

| SPAN ID | SITE ID1 | SITE ID2 | LENGTH (km) | FIBER TYPE |
|---|---|---|---|---|
| L1 | N1 | N2 | 331 | SMF |
| L2 | N3 | N5 | 185 | NZ-DSF |
| ... | ... | ... | ... | ... |
| Lx | N10 | N12 | 169 | SMF |

FIG.26

TRAFFIC DEMAND INFORMATION

| DEMAND ID | SITE ID1 | SITE ID2 | BANDWIDTH | NUMBER OF CHANNELS |
|---|---|---|---|---|
| D1 | N1 | N3 | OC-48 | 1 |
| D2 | N2 | N5 | OC-192 | 2 |
| ... | ... | ... | ... | ... |
| Dx | N10 | N13 | OC-192 | 1 |

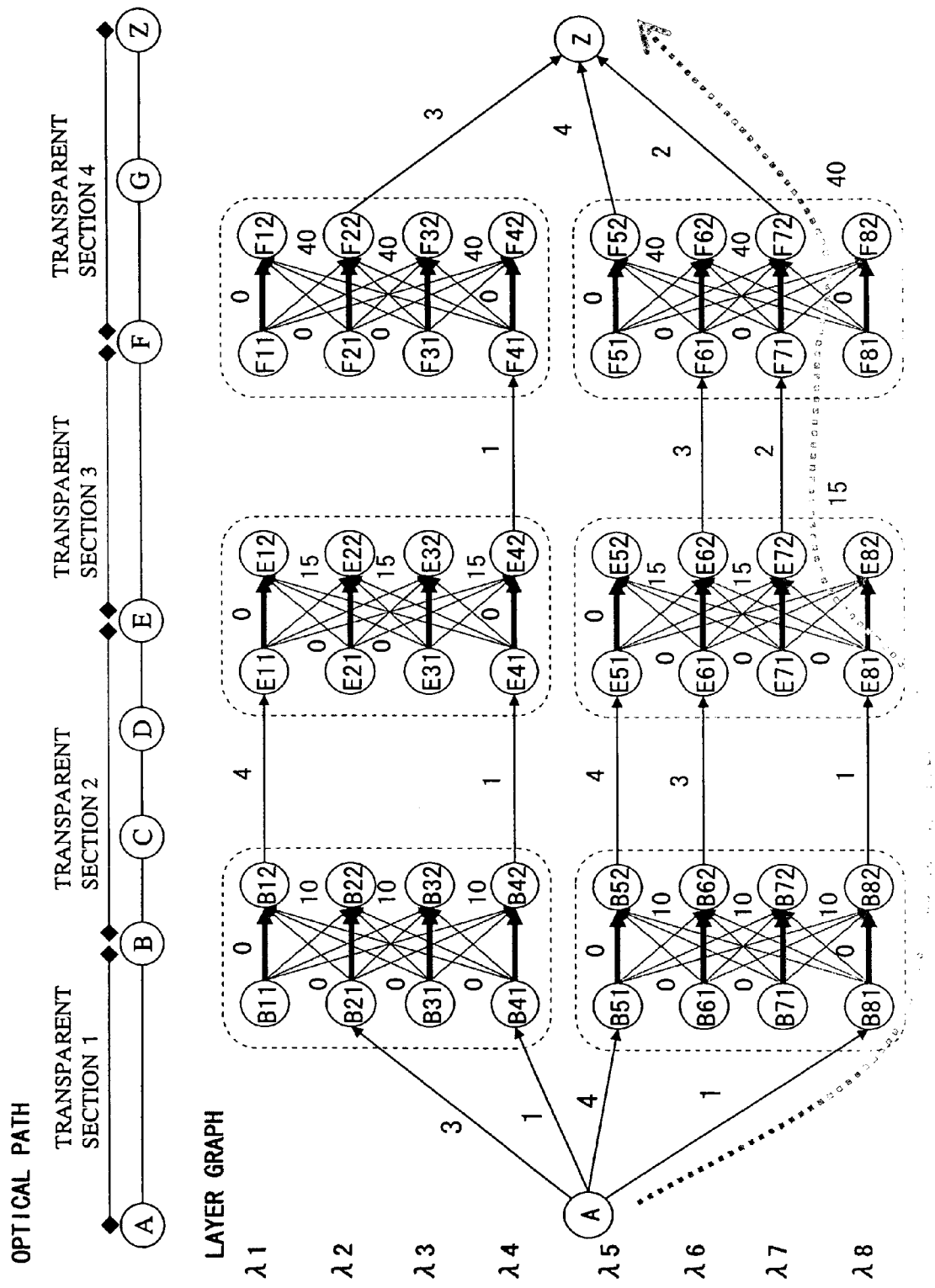

NETWORK DESIGN DEVICE

CROSS-REFERENCE TO RELATED APPLICATION

This application is a continuation of International Application PCT/JP03/12510 filed on Sep. 30, 2003, now pending, which claims priority from PCT/JP03/04099 filed on Mar. 31, 2003. The contents of International Application PCT/JP03/12510 are herein wholly incorporated by reference.

BACKGROUND OF THE INVENTION

1. Field of the invention

The present invention relates to a method and a device for designing a photonic network enabling communication of a large amount of information at high speed and low cost.

2. Description of the related art

A technique for allowing various multimedia services to be available regardless of time and location is required. As one of such techniques, there exists a photonic network technique enabling the communication of a large amount of information at high speed and low cost. Among photonic network techniques, a WDM (Wavelength Division Multiplexing) technique of multiplexing a plurality of optical signals having different wavelengths for the communication through a single optical fiber and a photonic node technique of constituting a network regarding each wavelength as a single communication path have been developed. With this development, the realization of a communication network system (hereinafter, referred to as a communication network) which minimizes the cost for introducing equipment (equipment cost) while maintaining high reliability for the reachability of signals is required.

A communication network is constituted by using a linear repeater (1R), a regenerative repeater (3R) and a branch device (HUB). Each of the devices is located in a predetermined station.

The linear repeater amplifies a signal received by itself at a predetermined gain so as to compensate for the attenuation of the signal. In the linear repeater, noise mixed in a main signal is sometimes amplified by signal amplification along with the main signal. Therefore, it sometimes happens in the linear repeater that a signal-to-noise ratio (an SN ratio) is degraded so as not to be reproducible on the receiver side.

The regenerative repeater includes a regenerator. The regenerative repeater first divides a multiplexed signal received by itself for each of channels. Next, the regenerative repeater performs optical-to-electric conversion by the regenerator for each channel so as to perform signal regeneration, regenerated signal amplification and electric-to-optical conversion. Since the signal regeneration is conducted in the regenerative repeater, the degradation of a signal-to-noise ratio can be prevented. The regenerative repeater is more expensive than the linear repeater. Therefore, the equipment cost can be reduced by reducing the number of linear repeaters in network design.

The HUB converts a signal received in a station demanding traffic into a client signal. The HUB branches a path into an appropriate route. The HUB sometimes includes a regenerator for each channel. The HUB executes signal regeneration and regenerated signal amplification by the regenerator as needed. Since paths, each having different starting point and terminal point, intersect and pass in a complex manner in the HUB, each channel is not necessarily required to include a regenerator. Therefore, the equipment cost can be reduced by reducing the number of regenerators provided for each channel.

In non-patent document 1, a conventional design method of a communication network is described. In the above-cited non-patent document, HUBs are first installed in all stations demanding traffic. The HUB includes regenerators for all the channels so as to execute signal regeneration and regenerated signal amplification. Then, only a loss in intensity of a multiplexed signal is examined. Based on the results of examination, a linear repeater and a regenerative repeater are provided between the stations. Then, in a network, in which the reachability of a signal between all the stations is ensured in the above-described manner, path routing with the shortest distance is executed. In the above-cited non-patent document, network resources such as a band or a wavelength are attempted to be efficiently used with the above-described method.

FIGS. 18 and 19 are flowcharts of network designing (referred to as a "basic technique") described in Japanese Patent Application No. 2002-204461 (unpublished) by the applicant of the present invention. Next, a method of designing a communication network based on the contents of the basic technique will be described. In this realization method, the optimal arrangement (disposition) of a regenerative repeater in consideration of signal noise between certain linear terminal stations is performed.

The terms used in the following description will be defined. A temporary linear repeater and a temporary regenerative repeater denote a linear repeater and a regenerative repeater, which are supposed to be temporarily provided so as to calculate a cumulative signal to noise ratio, respectively. The cumulative signal to noise ratio is a total amount of a signal to noise ratio (including a normalized noise quantity) over a certain 3R section (a regenerative repeater section) or a temporary 3R section (a temporary regenerative repeater section). The temporary 3R section (interval) denotes a section between the temporary regenerative repeater and the terminal station or a section between the temporary regenerative repeater and the regenerative repeater.

First, a total signal to noise ratio in the communication network is calculated (PS01). The total signal to noise ratio corresponds to a total amount of signal to noise ratios between a terminal station and a node adjacent to each other and between the nodes.

Next, the number of regenerative repeaters required for the communication between the terminal stations is calculated (PS02). The number of regenerative repeaters required between the terminal stations is calculated by Equation 1.

(Number of regenerative repeaters required between terminal stations)=(Total signal to noise ratio)/ (Determination value of the noise quantity transmittable without a regenerative repeater) Number truncated after the decimal point　　　[Equation 1]

Next, a determination value of the noise quantity over each 3R interval is calculated (PS03). Each temporary 3R section is designed at the following step so that a cumulative signal to noise ratio over this section does not exceed the determination value of the noise quantity calculated at PS03. The determination value of the noise quantity over each 3R section in the communication network is calculated by Equation 2.

(Determination value of the noise quantity over each 3R section)=(Total signal to noise ratio)/(Number of regenerative repeaters required between terminal stations)+1　　　[Equation 2]

Next, for the case where a temporary regenerative repeater is located at the position of each node sequentially from one terminal station P1 to the other terminal station P2, a cumulative signal to noise ratio over a temporary 3R section including the node is calculated (PS04).

Next, it is determined whether the value of the cumulative signal to noise ratio calculated at PS04 exceeds the noise quantity determination value calculated at PS03 or not (PS05). If the cumulative signal to noise ratio does not exceed the noise quantity determination value (PS05-YES), it is determined that a previous node, that is, a node at which the temporary regenerative repeater was provided immediately before a node (current node) at which the temporary regenerative repeater is currently provided is the temporary linear repeater, the terminal station on the transmitter side, or the regenerative repeater. Then, the assignment of the linear repeaters based on the results of determination is carried out (PS06). In the assignment of the linear repeaters, if the previous node is the temporary linear repeater, it is determined that the previous node is the linear repeater. On the other hand, if the previous node is the terminal station on the transmitter side or the regenerative repeater, the process transits to the next process without performing any process.

After the process at PS06, it is determined if the current node is the terminal station on the receiver side (PS07). If the current node is the terminal station on the receiver side (PS07-YES) the process of the system design is terminated (PS08).

On the other hand, if the current node is not a terminal station on the receiver side (PS07-NO), the current node is replaced not by the temporary regenerative repeater but by the temporary linear repeater, and a node to be processed is transited to a next node (PS09). Then, the process for this node is carried out. Specifically, the process after PS04 is carried out in the case where the temporary regenerative repeater is provided at the next node.

If the signal to noise radio exceeds the noise quantity determination value at PS05 (PS05-NO), it is determined whether the previous node is the temporary linear repeater or not (PS10). If the previous node is not the temporary linear repeater (PS10-NO) it is determined that the communication is impossible in the network to be designed (PS11). On the other hand, if the previous node is the temporary linear repeater (PS10-YES), the previous node is determined not as the temporary linear repeater but as the regenerative repeater. Then, the process after PS04 is carried out without transiting the node to be processed to the next node (PS12: the assignment of the regenerative repeaters).

FIG. 20 shows an example of the arrangement (disposition) of devices between terminal stations in a communication network designed based on the basic technique. In the communication network shown in FIG. 20, eleven nodes P2 to P12 are provided between a terminal station P1 and a terminal station P2. Hereinafter, the state where linear repeaters and regenerative repeaters are arranged based on the basic technique in the communication network shown in FIG. 20 will be descried.

First, a total signal to noise ratio is calculated as: 0.20× 12=2.40 (PS01). Next, the number of regenerative repeaters required between the terminal stations P1 and P13 is calculated to be "2" by Equation 1 (PS02). Herein, it is supposed that a noise quantity determination value communicable without any regenerative repeaters is "1.00". Next, a noise quantity determination value over each 3R section is calculated to be "0.80" by Equation 2 (PS03).

Next, the process after PS04 is carried out from the node P2 to the node P12. As a result, the regenerative repeaters are provided at the nodes P5 and P9, whereas the linear repeaters are provided at the remaining nodes, respectively. Therefore, all the cumulative signal to noise ratios over the 3R sections are equalized to be 0.80.

[Non-Patent Document 1]

"Design of ring and mesh based WDM transport networks" by P. Arijs, B. Van Caenegem, P. Demeester, P. Lagasse, W. Van Parys and P. Achten, Optical Networks Magazine, Vol. 1, no. 3, pp. 25 to 40, July 2000

According to the designing method described in the above-cited non-patent document 1, the regenerative repeater is necessarily provided for each station. Therefore, although the reliability of signal performance is high, a communication network, which is redundant and poorly efficient, is designed in view of equipment cost. In order to obtain an economical communication network by reducing the number of regenerative repeaters or regenerators, detailed designing in consideration not only of a loss in intensity of a multiplexed signal but also of noise or dispersion is required. However, if equipment is arranged at the minimum cost in the entire network, the number of combinations of arrangement of devices in the respective stations becomes enormous, considerably increasing the number of steps required for designing. Therefore, it is not practical.

On the other hand, according to the designing method based on the basic technique, signal performance is strictly examined for designing. In the designing method described in the basic technique, however, the signal performance is ensured exclusively for a linear section between terminal stations. In the actual communication network, paths, which respectively have different starting points and terminal points, intersect in a complex manner, and the signal regeneration is carried out for each channel. Therefore, even if a linear repeater, a regenerative repeater, a regenerator in a HUB and the like are efficiently arranged in a linear section, a redundant regenerative repeater or regenerator in the HUB is generated when the overall communication network is considered. In particular, in the HUB at the junction point in a mesh type communication network, there is a possibility that a redundant regenerator is provided.

SUMMARY OF THE INVENTION

As described above, in the conventional communication network designing method, efficient (for example, low equipment cost) design has not been realized for a non-linear communication network. Therefore, the present invention has an object to provide a network designing device capable of designing a communication network realized at economical equipment cost in designing of a non-linear communication network.

In order to solve the above problems, the present invention has the following structures. The first aspect of the present invention is a network designing device including a division unit, an assignment unit, a path formation unit and a deletion unit.

The network designing device assigns devices for compensating for the degradation of a signal, such as a linear repeater or a regenerative repeater, to a network including a plurality of channels and a branch node. Moreover, the network designing device assigns a device for terminating a channel to each of the channels at the branch nodes. The device for terminating a channel denotes a device for compensating for the degradation of a channel signal and for regenerating a signal and amplifying a regenerated signal, for example, which is a regenerator. The regenerator performs optical-to-electric conversion, regenerates a signal, amplifies a regenerated signal and performs electric-to-optical conversion. Specifically, the device for terminating a channel is a device capable of terminating a channel, which performs optical-to-electric conversion on a signal in the channel, regenerates the signal, amplifies the regenerated signal and performs electric-to-optical conversion.

The division unit assigns the devices for terminating one or more channel predestinated to be used (all channels if it is predestinated to be used for all the channels) to a terminal (terminating) node and each of the branch nodes. By the assignment, a plurality of linear partial networks, each having a preset terminal node or each of the branch nodes as a terminal node, are virtually created.

The assignment unit assigns devices for compensating for the degradation of a signal, such as a linear repeater or a regenerative repeater, to the nodes constituting each of the partial networks based on signal performance. For example, the assignment unit assigns a linear repeater and/or a regenerative repeater to each of the above-described nodes.

The path formation unit forms a specific path by combining the partial networks, each including the device assigned by the assignment unit. For example, the specific path is a path demanding traffic in a network to be designed.

The deletion unit deletes the device for terminating a channel, which is assigned to the branch node for each of the paths formed by the path formation unit based on signal performance.

The division unit, the assignment unit, the path formation unit and the deletion unit may be means realized by a specific program executed by an information processing device or may be devices realized as hardware chips. Specifically, the second aspect of the present invention is a program for making an information processing device execute such processing.

According to the first or second aspect of the present invention, a redundant "device for terminating a channel" assigned to a channel of a branch node is deleted from a network including the branch node, that is, a non-linear network.

For example, for the path formed by the path formation unit, the deletion unit calculates a cumulative value of the degradation of signal performance at each node from the terminal node or the node to which the regenerative repeater is assigned (a calculation starting node) along the path. Then, if there is a branch node in an section to the other terminal node or the node to which the regenerative repeater is assigned (the maximum value node) at which the cumulative value of the degradation of signal performance from the calculation starting node becomes maximum without exceeding a specific defined value, the device for terminating the channel, which is assigned to the branch node, is deleted.

At this time, the deletion unit deletes the device for terminating the channel corresponding to the path formed by the path formation unit (that is, the path to be currently processed) at the branch node. The specific defined value indicates that signal regeneration is possible if the cumulative value of the degradation of signal performance does not exceed the defined value in the network. Therefore, the equipment cost for the device for terminating the channel can be kept down.

The first aspect according to the present invention further includes a channel assignment unit for routing a path and assigning channels to a routed path based on a traffic demand between the nodes, in which the division unit may create a partial network based on the path routed by the channel assignment unit, and the path formation unit may form the path routed by the channel assignment unit as a specific path.

The first aspect according to the present invention further includes a continuation determination unit for determining whether or not to continue processing after the processing by the deletion unit, in which the channel assignment unit may route a new path if the continuation determination unit determines to continue the processing, and the division unit, the assignment unit, the path formation unit and the deletion unit may execute processing for the path newly routed by the channel assignment unit.

The channel assignment unit of the first aspect according to the present invention may make a search for an available path based on signal performance from a current installation state of communication network equipment when a new path is to be routed.

The division unit of the first aspect according to the present invention may not constitute a partial network including a branch node having two connection routes as a terminal node.

The first aspect according to the present invention further includes an output unit for performing output indicating a device assigned to each node after processing by the deletion unit.

The continuation determination unit of the first aspect according to the present invention may determine to continue the processing if equipment cost in a newly designed network is lower than that in the previously designed network.

Moreover, the continuation determination unit of the first aspect according to the present invention may determine to continue the processing if an unset path (a new path) is present.

The third aspect according to the present invention provides a division device operating as a branch node constituting a network, the device being designed by the steps of: dividing a network having a plurality of channels and branch nodes into a plurality of linear partial networks using a predetermined terminal node or each branch node as the terminal nodes by allocating a device terminating one or more channels to be used to the terminal node and each branch node; allocating a linear relay device and/or a reproduction relay device to a node constituting each partial network according to the signal performance; forming a particular path by combining the partial networks to which a device has been allocated by the allocation unit; and deleting a device terminating the channel allocated to the branch node for each path formed by the path formation section according to the signal performance.

According to the present invention, a communication network realized at efficient (for example, at low equipment cost) and economical equipment cost can be designed for a non-linear communication network.

Moreover, the present invention can be specified as a network system designed by the network designing device having the above-described characteristics.

The fourth aspect of the present invention is a device for designing a network, in which path terminating devices are disposed at a starting point and a terminal (terminating) point of each path to set a plurality of paths connecting sites in a the network to each other, a required number of signal degradation compensating devices are disposed between the starting point and the terminal (terminating) point of each path, it is connected between each of the terminating device and the signal degradation compensating device, and the signal degradation compensating devices by each fiber including a plurality of channels, the device including: an section division unit for dividing the communication network including a plurality of sites respectively corresponding to the starting point and the terminal point of the plurality of paths into a plurality of linear design sections and for disposing a device for terminating all the channels for the sites positioned on both ends of each of the design sections; a section designing unit for disposing, in each designing section, a linear repeater for amplifying a signal and/or a regenerative amplifier including a regenerator of signals and amplifying a signal regenerated in the regenerator as the signal degradation compensation device based on signal performance in the designing section; a channel assignment section for assigning a channel to each of the paths after each of the designing sections, in which the signal degradation compensation device is disposed, is combined so that channel switching required for the path is realized by using the regenerator in the regenerative amplifier disposed on each path; and an adjustment unit for changing, based on reachability of signals from the starting point to the terminal point for each of the paths, the disposition of the regenerator and/or deleting the regenerator provided on each of the paths so that a common regenerator is used as both the regenerator required for the channel switching and the regenerator required for the signal degradation compensation as much as possible and that the minimum required regenerator for the signal degradation compensation is left.

According to the fourth aspect, by the network designing, the minimum number of regenerators provided on the paths can be disposed to satisfy the requirements both from the viewpoint of signal degradation compensation and from the viewpoint of channel conversion (channel collision prevention). As a result, the cost required for network construction can be reduced.

Preferably, the channel assignment unit in the fourth aspect assigns the channels so that a frequency of channel switching in each of the paths is minimized.

By reducing the number of channel switching times as much as possible, the occurrence of a signal delay or fluctuation can be prevented. Moreover, a processing load on the device for switching the channels can be reduced or a structure can be simplified.

Moreover, preferably, the channel assignment unit in the fourth aspect creates a graph for every path, the graph including: input and output channels connectable to each of the regenerative amplifiers on a path, which is represented in a layered structure; a first link defined, for connecting each of the input channels in each of the regenerative amplifiers to each of the output channels in the same layer ; a second link defined, for connecting each of the input channels of each of the regenerative amplifiers to each of the output channels in different layers in which it can be performed channel switching in the regenerative amplifier; a third link defined between the output channel and the input channel in the same layer available between adjacent regenerative amplifiers; a fourth link defined between a channel available at a starting point of the path and an input channel in the same layer of the regenerative amplifier positioned immediately after the available channel; and a fifth channel being defined between a channel available at a terminal point of the path and an output channel in the same layer of the regenerative amplifier positioned immediately before the terminal point, in which a graph is created by weighting the first to fifth links under the condition of: the second link>the third to the fifth links>the first link, and wherein the channel assignment unit determines the channels to be assigned to the path, between the starting point to the regenerative amplifier, between the regenerative amplifiers, and between the regenerative amplifier and the terminal point are determined by a shortest path search from the starting point to the terminal point of the path using the graph.

The channel assignment unit performs such processing, so that the channels can be assigned to the paths with the minimum frequency of channel switching. The second link is set in a vacant channel between the starting point to the regenerative amplifier, between the regenerative amplifiers, and between the regenerative amplifier and the terminal point.

In this case, the channel assignment unit can weight the third to fifth links with the same weight, respectively.

Alternatively, predetermined priority may be defined for the plurality of channels so that the channel assignment unit weights the third to fifth links in such a manner that the weight decreases as the priority becomes higher. The priority is for, for example, the use of channels. In this manner, the network can be designed so that the channels are assigned in a desired order.

Furthermore, preferably, the channel assignment unit in the fourth aspect assigns the channels to the paths so that the signal degradation compensation and the channel switching are executed in the regenerative amplifier of the site with the most degraded cumulative signal performance among a plurality of sites in which the regenerative amplifiers on the paths are provided.

In this manner, the network can be designed so that the channel is switched in the site in which signal regeneration is the most required.

In this case, for example, the channel assignment unit preferably weights each second link with a larger weight as the signal performance degrades.

Furthermore, the present invention can be specified as a network designing method having the same characteristics as those of the network designing device as the fourth aspect, a program for making a computer function as the network designing device, a recording medium on which the program is recorded, and a network system constructed based on the design achieved by the network designing device or method.

BRIEF DESCRIPTION OF THE DRAWINGS

FIG. 5 shows an example of topology information;

FIG. 6 shows an example of topology information;

FIG. 7 shows an example of traffic demand information;

FIG. 8 shows an example of signal performance information;

FIG. 9 shows an example of path route information;

FIG. 11 is a diagram showing a specific example of a signal to noise ratio;

FIG. 16 shows a specific example of a signal to noise ratio;

FIG. 24 shows an example of a data structure of site information;

FIG. 25 shows an example of a data structure of fiber span information;

FIG. 26 shows an example of a data structure of traffic demand information;

FIG. 31 is an explanatory diagram of wavelength assignment (a fourth wavelength assignment method) using a layer graph in the case where performance of an optical signal is considered.

DETAILED DESCRIPTION OF THE PREFERRED EMBODIMENTS

Next, a network designing device in the embodiments of the present invention will be described using the drawings. The description of the embodiments is merely exemplary, and a structure of the present invention is not limited to the following description.

First Embodiment

A network designing device according to the present invention assumes a virtual network model and virtually executes the design of the network on the device. A structure of the designed network is output from the network designing device as a display, a printer, or a data file. The network designing device according to the present invention is, for example, a computer aided design (CAD) system for network equipment.

[Network]

Figure 1:
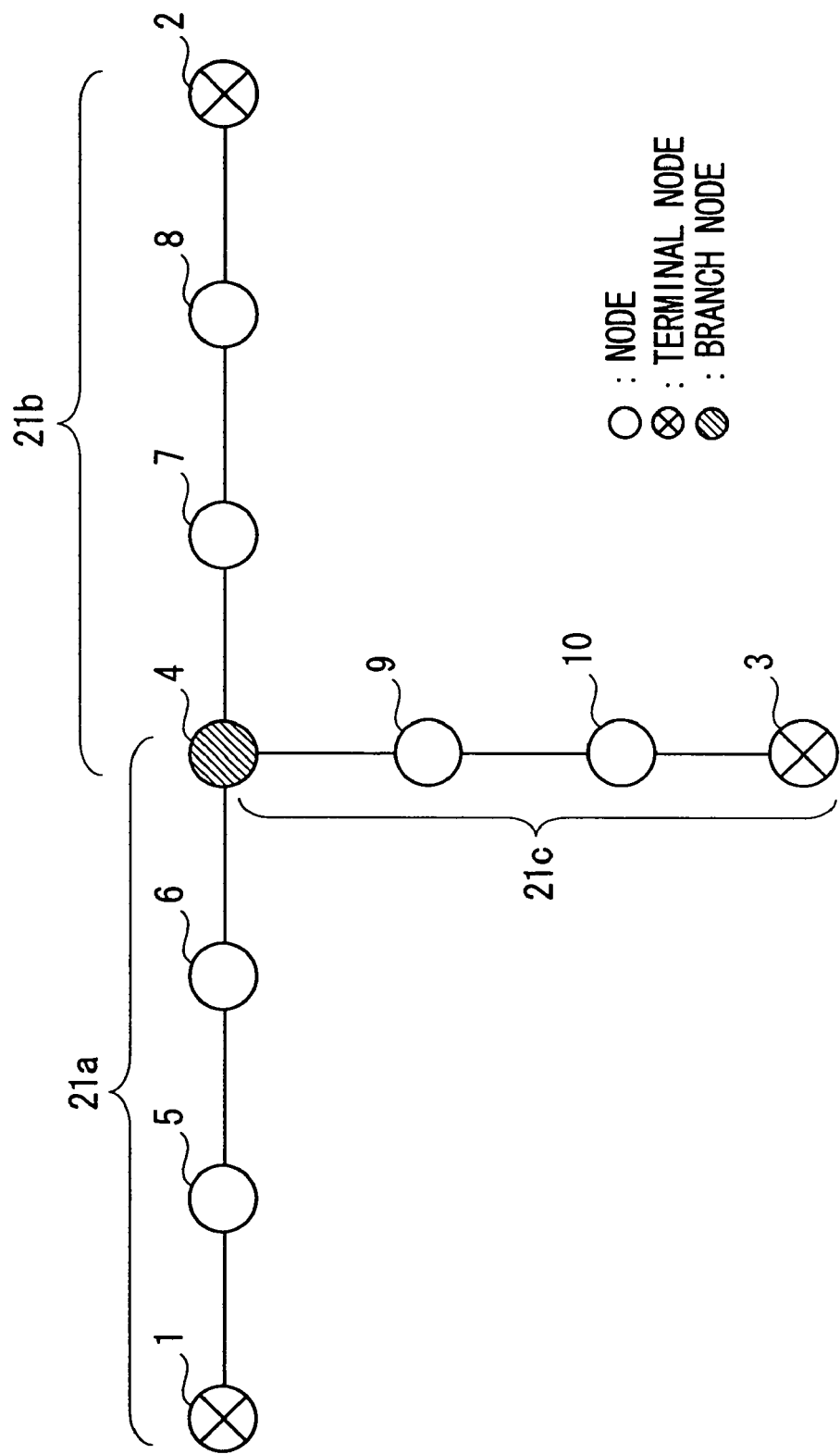
FIG. 1 is a diagram showing an example of a model of a network.

FIG. 1 is a diagram showing a model of a network corresponding to a target of network design by a network designing device according to the present invention. The network shown in FIG. 1 is constructed by terminal nodes 1 to 3, a branch node 4, and nodes 5 to 10. Each of the nodes indicates a station. Therefore, a device installed in the station is assigned to each of the nodes. Specifically, in practice, a device assigned to a node in network design is provided for the station.

Each of the nodes is connected by a link. The link denotes a fiber. Specifically, in practice, a fiber is provided as a link. Each of the stations or a device in the station is connected by a fiber so as to be communicable.

The terminal nodes 1 to 3 are connected to each other through the branch node 4. The nodes 5 to 10 are provided between the terminal nodes 1, 2, and 3 and the branch node 4, respectively. In the network shown in FIG. 1, the network design is carried out supposing that each channel with traffic demand exists between the terminal nodes 1 and 2 and between the terminal nodes 1 and 3, respectively.

A terminal device is assigned to each of the terminal nodes 1 to 3. A HUB is assigned to the branch node 4. As a result of the network design, a linear repeater or a regenerative repeater is assigned to each of the nodes 5 to 10.

Figure 2:
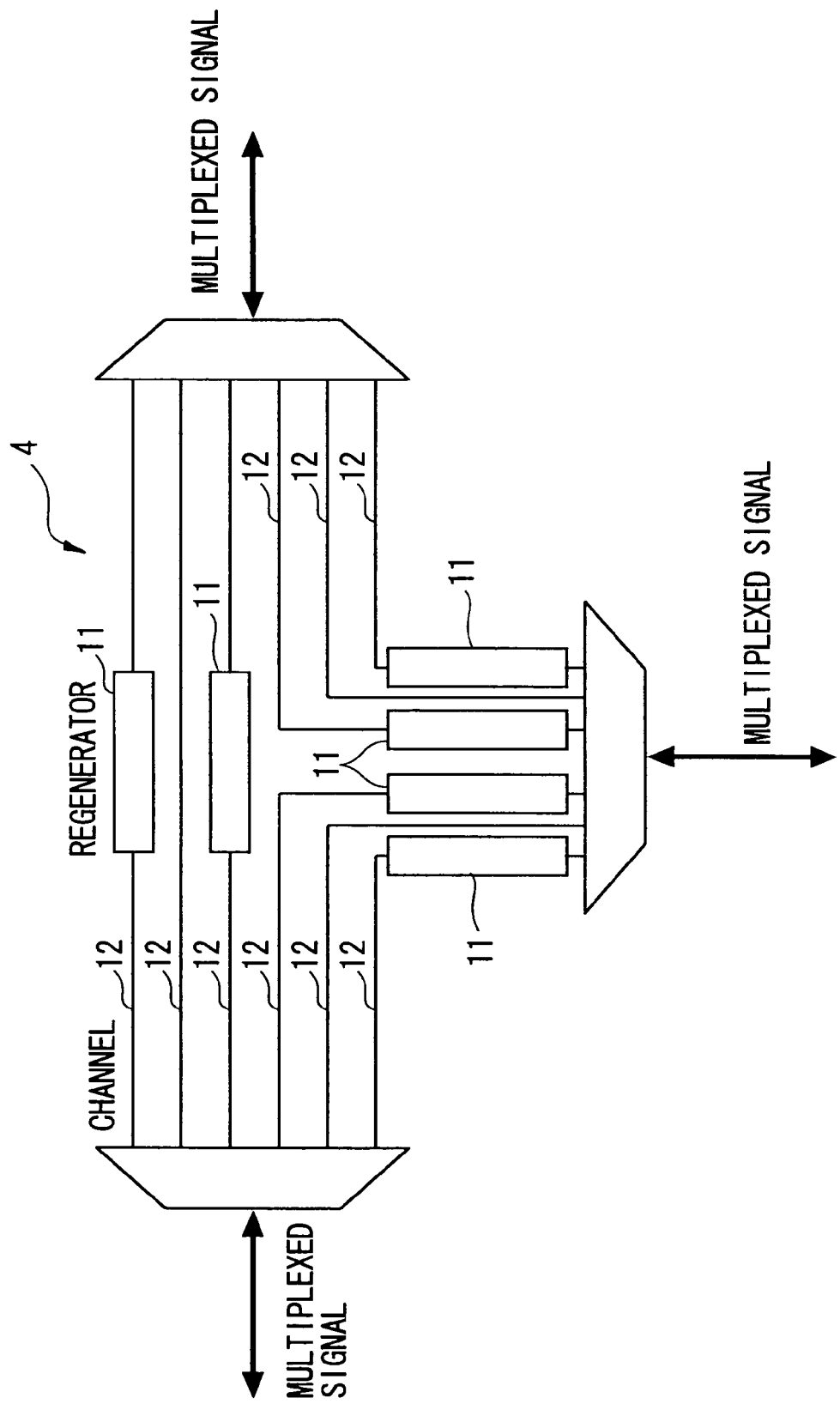
FIG. 2 is a diagram showing an exemplary structure of a HUB.

FIG. 2 is a view showing an exemplary structure of the HUB assigned to the branch node 4. The HUB includes regenerators 11 and channels 12.

A multiplexed signal is input to the HUB. When the multiplexed signal is input to the HUB, the multiplexed signal is divided into signals for the respective channels 12. The signal for each of the channels 12 is transmitted through the HUB in accordance with a predefined path to be multiplexed again so as to be output to the outside.

The regenerators 11 are assigned to specific ones of the channels 12 in the HUB after the network design. The regenerator 11 performs optical-to-electric conversion, regenerates a signal, amplifies the regenerated signal, and performs electric-to-optical conversion.

[System Configuration]

Figure 3:
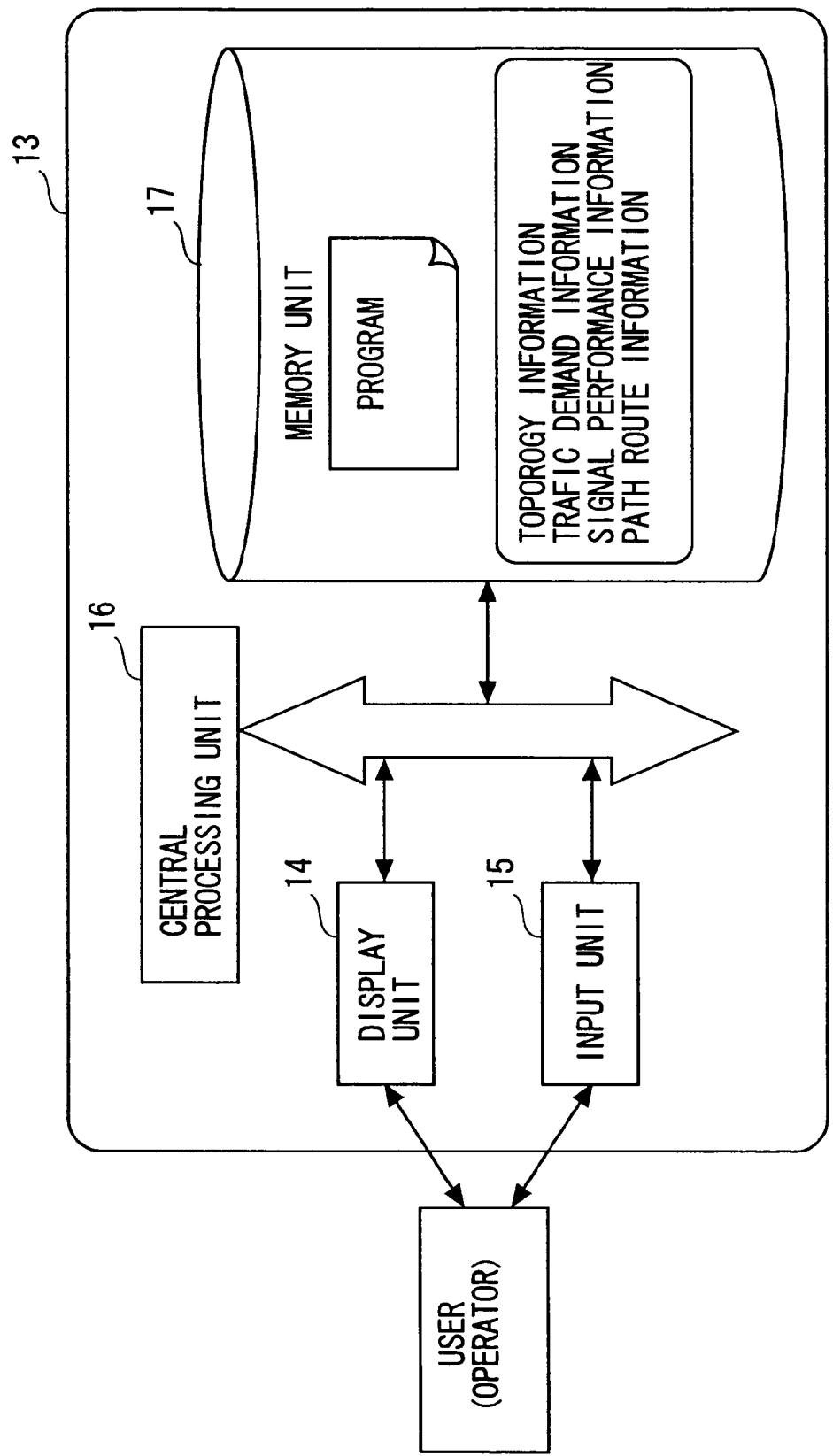
FIG. 3 is a diagram showing hardware blocks of a network designing device.

FIG. 3 is a view showing hardware blocks of the network designing device 13 according to the present invention. The network designing device 13 is constituted by using an information processing device (a computer) such as, for example, a personal computer (PC) or a workstation (WS). In terms of hardware, the network designing device 13 includes a display unit 14, an input unit 15, a central processing unit 16 (CPU), and a memory unit 17 (a main memory (RAM), an auxiliary memory (a flash memory, a hard disk), or the like), which are connected through buses.

<Display Unit>

The display unit 14 operates as a user interface. The display unit 14 is constituted by using an output device such as a liquid crystal display, a cathode ray tube (CRT), or a printer. The display unit 14 outputs the results of processing by the central processing unit 16.

<Input Unit>

The input unit 15 is operated by a user to deliver various instructions, data, or the like to the central processing unit 16. As examples of the data input from the input unit 15, there are topology information, traffic demand information, signal performance information, and the like. The input unit 15 is constituted by using, for example, an input device (examples: a keyboard and a pointing device) serving as a user interface, a network interface (examples: a LAN interface and a WAN interface), and various drives (examples: a floppy disk drive, a CD-ROM drive, a DVD-ROM drive, an MO drive, and a flash memory reader).

<Central Processing Unit>

Figure 4:
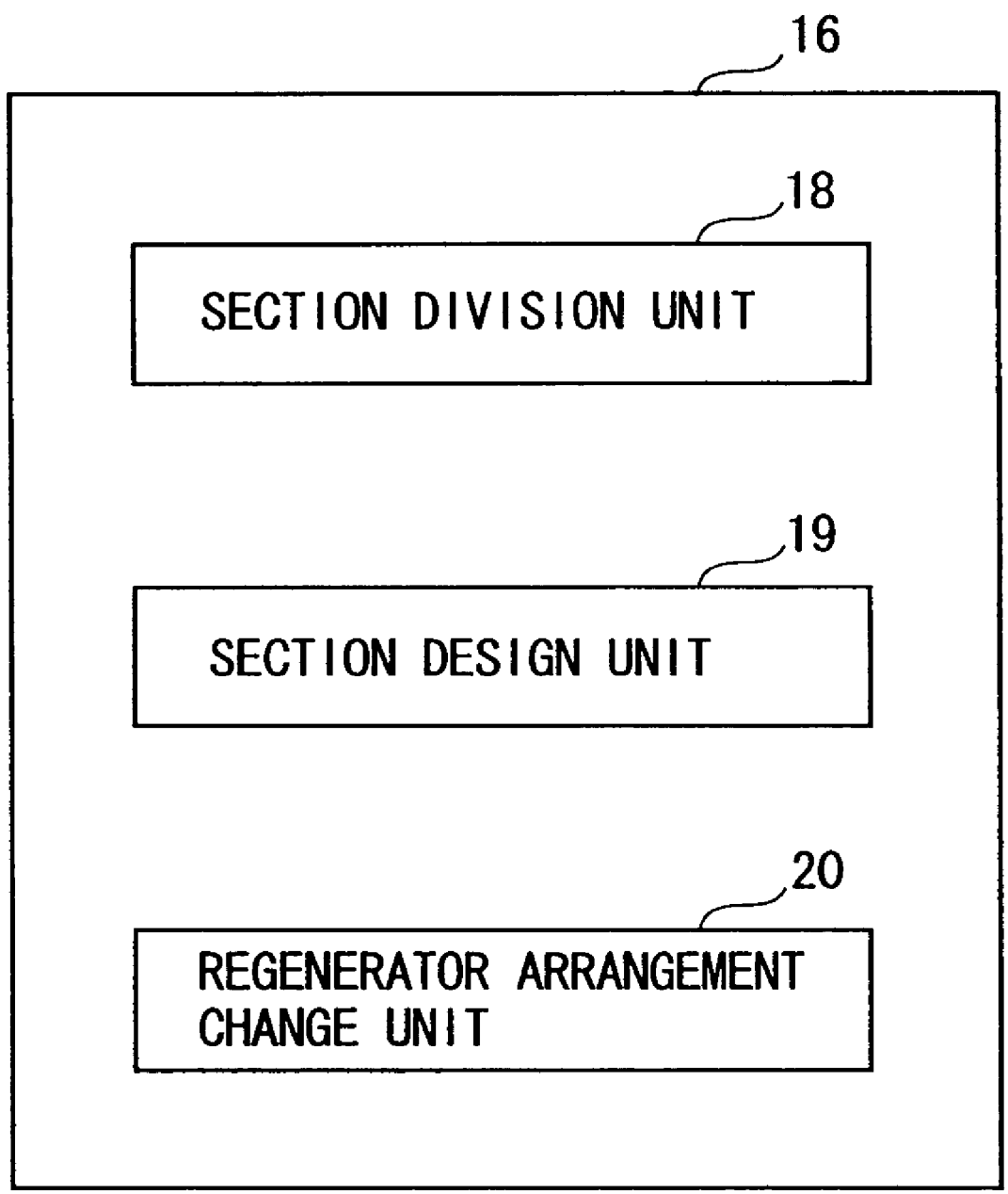
FIG. 4 is a diagram showing functional blocks of the network designing device.

FIG. 4 is a view showing functional blocks in the central processing unit 16 in the network designing device 13. The central processing unit 16 executes a program according to the present invention stored in the memory unit 17 so as to operate as a section division unit 18, a section design unit 19, and a regenerator arrangement change unit 20.

The section division unit 18 executes section division processing. By the execution of the section division processing, a network to be a target of the network design is divided into one or more linear partial networks 21 (21a to 21c in FIG. 1). For example, the network shown in FIG. 1 is divided into three partial networks 21a to 21c, respectively connecting each of the terminal nodes 1 to 3 and the branch node 4. Moreover, by the execution of the section division processing, the HUB is assigned to the branch node 4. The regenerator 11 is assigned to one or more channels for which the use of the HUB is predestinated (in this example, the use of all channels having the HUB is predestinated). In this manner, by the execution of the section division processing, the network including the branch node 4 is divided into one or more linear partial networks with the branch node 4 as a boundary.

The section design unit 19 executes section design processing. By the execution of the section design processing, a linear repeater or a regenerative repeater is efficiently assigned to each of the nodes 5 to 10 constituting each partial network 21. A method based on the basic technique is basically used for the efficient assignment of the linear repeater or the regenerative repeater. Moreover, by the execution of the section design processing, the respective partial networks 21 are synthesized into one or more paths. The path denotes a path of interest in the network design, specifically, in FIG. 1, two paths, i.e., a path connecting the terminal nodes 1 and 2 to each other and a path connecting the terminal nodes 1 and 3 to each other.

The regenerator arrangement change unit 20 executes regenerator arrangement change processing. By the execution of the regenerator arrangement change processing, signal performance is verified for each of the paths of interest. Then, the redundant regenerator 11 is deleted from the HUB assigned to the branch node 4. As a result, for example, as shown in FIG. 2, the internal structure of the HUB is designed such that the regenerator 11 is assigned to the partial channel 12.

<Memory Unit>

The memory unit 17 stores various programs (an OS, an application, and the like). Moreover, the memory unit 17 stores topology information, traffic demand information, signal performance information, and path route information as information used for the network design.

FIGS. 5 and 6 show an example of the topology information. The topology information is composed of fiber link information shown in FIG. 5 and node position information shown in FIG. 6.

First, the fiber link information is described with reference to FIG. 5. A table of the fiber link information contains a link ID, a node ID1, a node ID2, a length, and a fiber type as fields.

The link ID indicates a proper link identifier as the entire communication network. The node ID1 indicates a connection node on the upstream side of the fiber link. The node ID2 indicates a connection node on the downstream side of the fiber link. The length indicates a physical length of a fiber. The length is indicated in units of kilometer (km) for the table shown in FIG. 5. The fiber type indicates the type of a used fiber. The fiber type is used to determine a characteristic such as signal degradation.

A link indicated by a certain link ID is a link terminated with the nodes indicated by the node ID1 and the node ID2 on the upstream side and the downstream side, respectively. The link is constituted by using a fiber of the type indicated by the fiber type with the length indicated by the length.

The node position information will now be described with reference to FIG. 6. A table of the node position information contains a node ID, latitude, and longitude as fields.

The node ID indicates a proper node identifier as the entire communication network. The node ID corresponds to the node ID1 and the node ID2 in the fiber link information. The latitude and the longitude indicate a geographic coordinate of the node. The latitude and the longitude may be specified by any description method. For example, the north latitude and the east longitude may be indicated by a positive value whereas the south latitude and the west longitude may be indicated by a negative value. Furthermore, the geographic coordinate of the node may be specified by a value other than the latitude and the longitude.

A direct distance between the nodes can be calculated from the latitudes and the longitudes of the respective nodes. In practice, however, the nodes are not necessarily connected through a direct linear link. Therefore, the fiber link information in the topology information is required to have a length of each of the links as a field.

FIG. 7 shows an example of the traffic demand information. Hereinafter, the traffic demand information will be described with reference to FIG. 7. A table of the traffic demand information includes a demand ID, a starting point, a terminal (terminating) point, a bandwidth, and the number of channels as fields.

The demand ID is a proper identifier corresponding to each traffic demand. The starting point indicates a node ID of a transmitter node of the traffic. The terminal point indicates a node ID of a receiver node of the traffic. The number of channels indicates the number of actually set paths.

FIG. 8 shows an example of the signal performance information. The signal performance information will be described below with reference to FIG. 8. A table of the signal performance information contains a fiber type, the number of multiplexing, a fiber loss, and a signal to noise ratio as fields. The table of the signal performance information is used to obtain the signal to noise ratio from the values of the fiber type, the number of multiplexing, and the fiber loss.

The fiber type corresponds to the fiber type in the table of the fiber link information. FIG. 8 shows a single-mode optical fiber (SMF) and a non-zero dispersion shifted single-mode optical fiber (NZ-DSF) as examples. The number of multiplexing, the fiber loss, and the signal to noise ratio indicate the characteristics of each fiber type. The fiber loss is indicated in units of dB, and the signal to noise ratio is indicated in units of dB/km. A signal to noise ratio of a noise generated in a linear repeater depends on the characteristics of each fiber type indicated in the signal performance information.

How to calculate the signal to noise ratio will be described below. As an example, the case where the fiber type is NZ-DSF, the number of multiplexing is 176, and the fiber loss is 15 dB is described.

First, values, 23 dB and 5, are given from the characteristics of the fiber type as a dB value not to be exceeded and the number of links not to be exceeded in one fiber. A determination value of the signal to noise ratio on the basis of the entire section is supposed to be 1.00.

In this case, the noise quantity communicable without a regenerative repeater (the standard maximum loss quantity) is obtained to be 115 dB by multiplying the above two values given by the characteristics of the fiber type. Then, the signal to noise ratio of each links is obtained by dividing the fiber loss by the standard maximum loss quantity to be 0.130.

FIG. 9 shows an example of the path route information. Hereinafter, the path route information will be described with reference to FIG. 9. A table of the path route information contains a path ID, a path route, and a node with a regenerator as fields.

The path ID indicates a proper identifier of a path corresponding to one channel of the traffic demand as the entire communication network. The path route information indicates the nodes through which the path passes in a sequential manner. The node with a regenerator indicates a node provided with a regenerator among the nodes 5 to 10 through which the path passes. Specifically, the node with a regenerator is indicated by a node ID of the node to which a regenerative repeater is assigned.

[First Operation Example]

Figure 10:
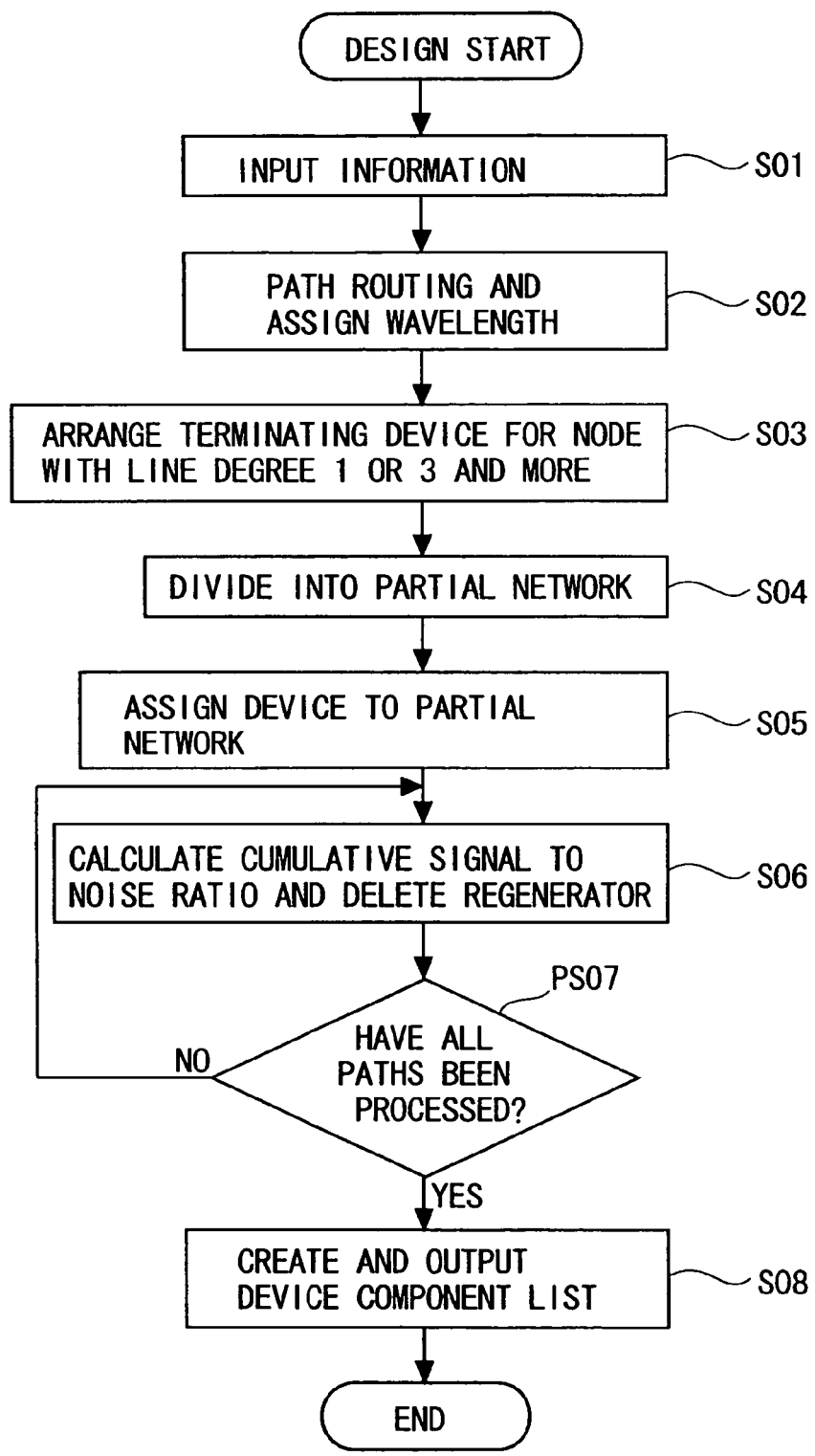
FIG. 10 is a flowchart of a first example of operation.

Next, the first operation example of the network designing device 13 according to the present invention will be described. FIG. 10 is a flowchart of a first operation example. In the following description, the network model to be a target of the network design is supposed to be the network shown in FIG. 1.

In the first operation example, the topology information, the traffic demand information, and the signal performance information are first input to the network designing device 13 (S01). As the topology information, for example, information corresponding to the network model as shown in FIG. 1 is input. As the traffic demand information, information indicating that there are traffic demands for an optical path of one channel from the terminal node 1 to the terminal node 2 and an optical path of one channel from the terminal node 1 to the terminal node 3 is input.

Next, a path with the shortest distance is routed. An appropriate wavelength is assigned to the path in a link through which the path passes (S02). Specifically, the optical paths are routed between the terminal nodes 1 and 2 and between the terminal nodes 1 and 3, so that a wavelength is assigned to each of the optical paths to prevent the collision of wavelengths.

Next, a device for terminating one or more channels predestinated for use (in this example, all channels) is assigned to each of the nodes with a line degree (measure) of 1 or 3 or more (S03). The device for terminating a channel is a device including at least a regenerator. Specifically, by the processing at S03, the same effects as those obtained by assigning the regenerators to at least all the channels are generated at such a node. The line degree indicates the number of links connected to a certain node. For example, the terminal nodes 1 to 3 have a line degree of 1. The branch node 4 has a line degree of 3. The nodes 5 to 10 have a line degree of 2.

Next, the network to be a target of the network design is divided into one or more linear partial networks divided by the nodes with the line degree of 1 or 3 or more (S04). Specifically, the network shown in FIG. 1 is divided into the linear partial networks 21a, 21b, and 21c. The above-described processing is executed by the section division section 18 as section division processing.

Next, the section design processing is executed by the section design section 19. Specifically, the assignment of a linear repeater and a regenerative repeater to each of the partial networks 21a to 21c is executed based on the method indicated in the basic technique (S05). The processing at S05 will be more specifically described below.

First, a signal to noise ratio in each link (that is, a signal to noise ratio of the fiber between the adjacent nodes 1 to 10) is obtained based on each of the input information. FIG. 11 is a table showing signal to noise ratios obtained for the respective links. Based on the table, a signal to noise ratio determination value in each 3R section is calculated by using Equations 1 and 2 to be 0.80.

Figure 18:
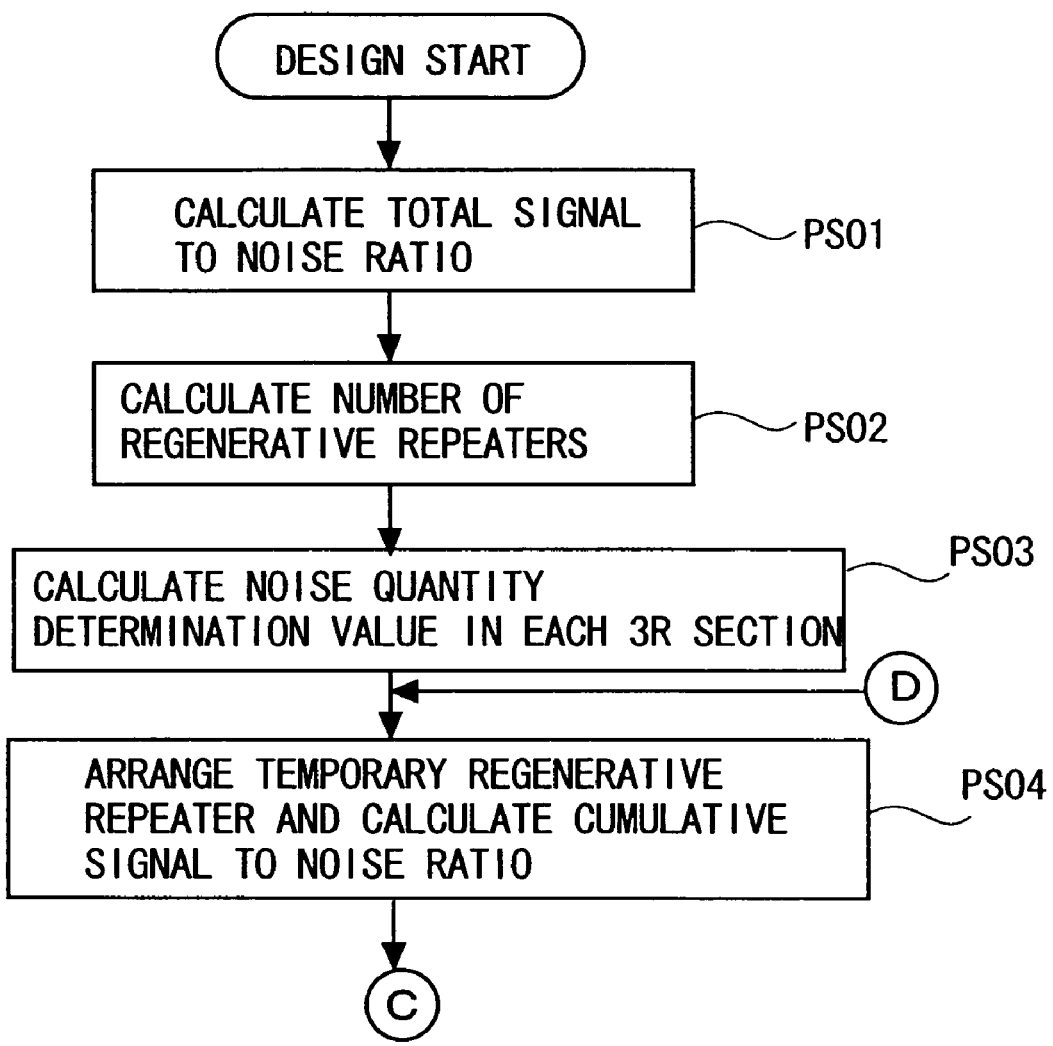
FIG. 18 is a flowchart of a conventional technique.
Figure 19:
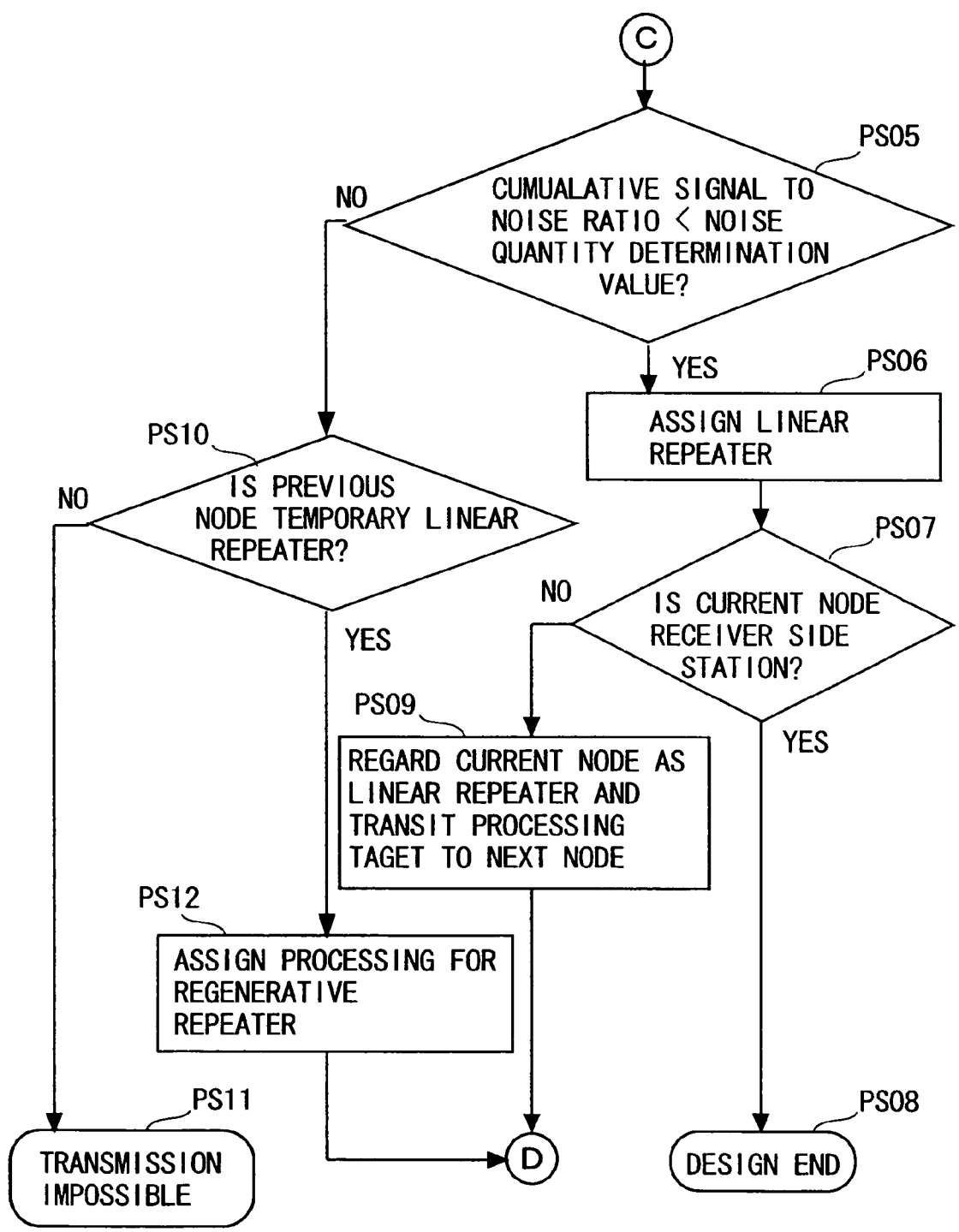
FIG. 19 is a flowchart of the conventional technique.
Figure 20:
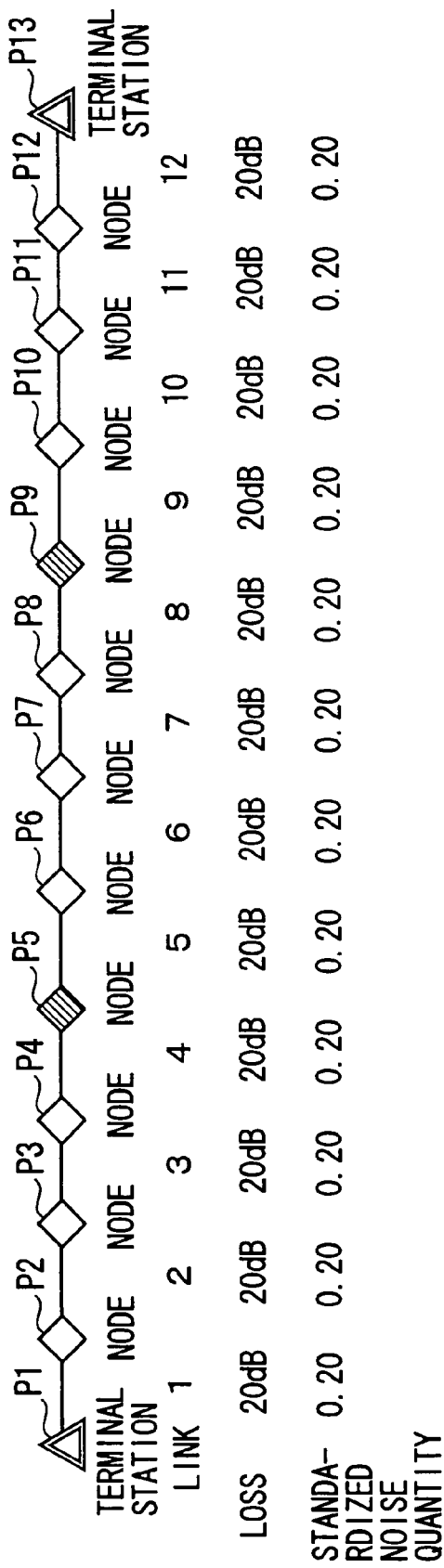
FIG. 20 shows an example of a model of a network designed by the conventional technique.

Next, the network design is started from the terminal node 1. At the node 5, a cumulative signal to noise ratio is 0.40. At the node 6, a cumulative signal to noise ratio is 0.80. Therefore, a linear repeater is assigned to the node 5, whereas a regenerative repeater is assigned to the node 6. Such processing of the network design continues in accordance with the flowcharts of FIGS. 18 and 19, so that the linear regenerators are assigned to the nodes 5, 8, and 10, respectively, whereas the regenerative repeaters are assigned to the nodes 6, 7, and 9, respectively.

Next, the regenerator arrangement change processing is executed by the regenerator arrangement change section 20. Specifically, the processing at S06 and S07 is executed.

First, in the order of the nodes of each path, a cumulative value of the signal to noise ratio is calculated. In this case, a cumulative value of the signal to noise ratio is calculated without considering the regenerator 11 assigned to a channel in the HUB at the branch node 4. Then, at the branch node, which is passed through while the cumulative value of the signal to noise ratio does not exceed a defined value (a noise quantity determination value in each 3R section), the regenerator 11 assigned to the channel corresponding to the path taken into consideration is deleted (S06). Hereinafter, the processing at S06 will be described taking the path connecting the terminal nodes 1 and 2 to each other as a specific example. At the branch node 4, the cumulative value of the signal to noise ratio is 0.40, and therefore, does not exceed the defined value. Specifically, the branch node 4 is passed through while the cumulative value of the signal to noise ratio does not exceed the defined value. Therefore, the regenerator 11 assigned to the channel corresponding to the path connecting the terminal nodes 1 and 2 to each other at the branch node 4 is deleted.

Next, it is determined if the processing at S06 has been executed for all the paths or not (S07). Therefore, the processing at S06 is executed for the remaining path, that is, the path connecting the terminal nodes 1 and 3 to each other (S07-NO). By the processing, the regenerator 11 assigned to the channel corresponding to the path connecting the terminal nodes 1 and 3 to each other at the branch node 4 is similarly deleted.

If it is determined in the processing at S07 that the processing has been executed for all the paths (S07-YES), a component list of the devices (the linear repeater, the regenerative repeater and the regenerator 11 in the HUB) assigned to the respective nodes is created to be output (S08).

[Functions and Effects of the First Operation Example]

Figure 12:
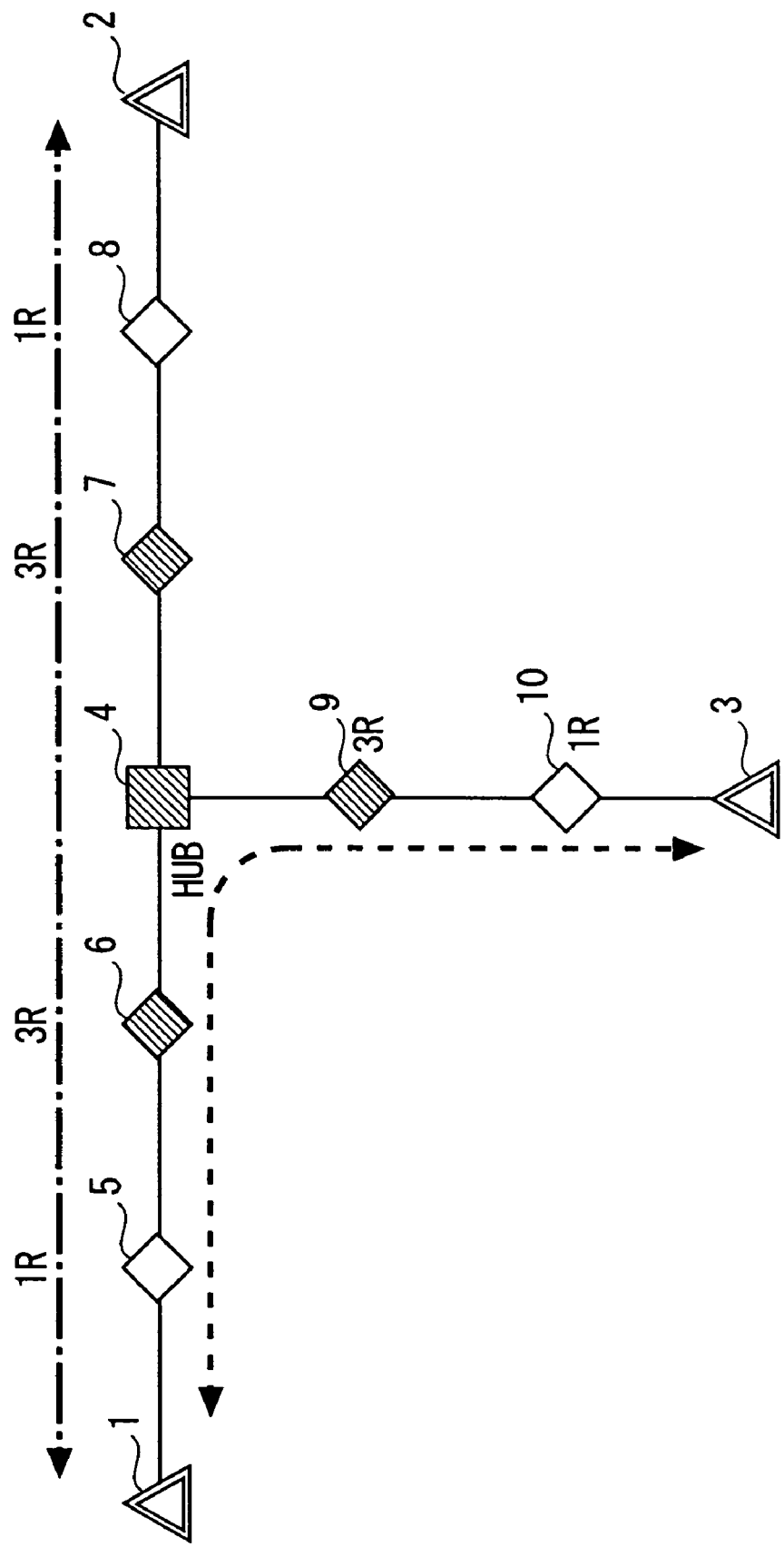
FIG. 12 is a diagram showing an example of design of a network.

FIG. 12 shows a view showing a configuration of the network based on the output component list, that is, a configuration of the network designed by the processing at S01 to S07 by the network designing device 13. In the first operation example, the network is divided into one or more linear partial networks (design section) by the section division processing by the section division section 18. By the section design processing by the section design section 19, the linear repeater and the regenerative repeater are assigned to the nodes of each partial network. Then, a part of the regenerators 11 assigned to all the channels in the HUB at the branch node 4 is deleted. Therefore, even in the network including the branch node 4, that is, a non-linear network, the design of an efficient communication network can be made possible. Specifically, first, even in a non-linear network, the efficient arrangement of the linear repeater and the regenerative repeater, that is, the efficient design of a network is made possible. Moreover, the redundant regenerator 11 is deleted from the regenerators 11 assigned to the channels in the HUB at the branch node 4. Therefore, the cost for design (equipment introduction cost) of a non-linear network can be reduced.

[Second Operation Example]

Figure 13:
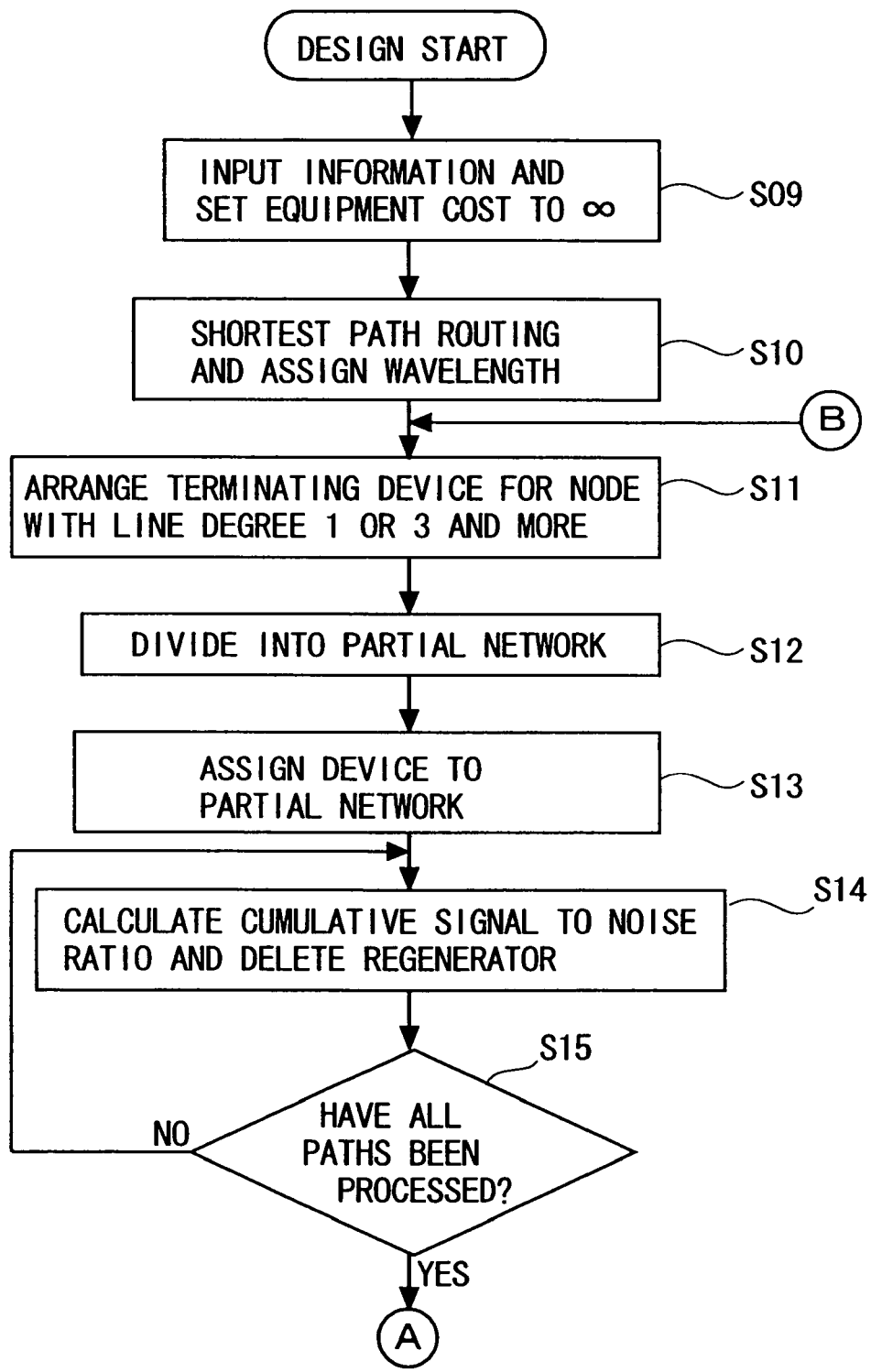
FIG. 13 is a flowchart of a second example of operation.
Figure 14:
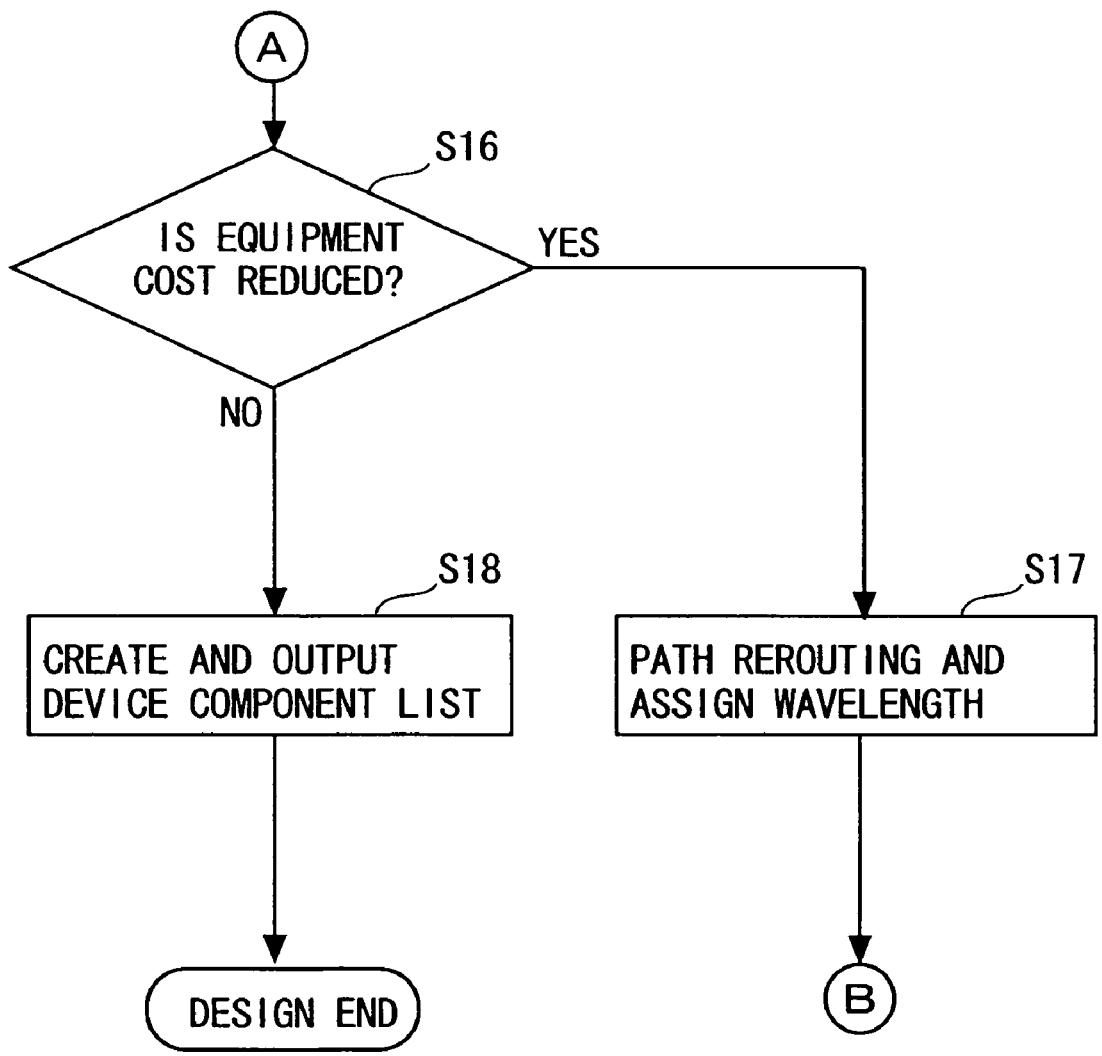
FIG. 14 is a flowchart of the second example of operation.
Figure 15:
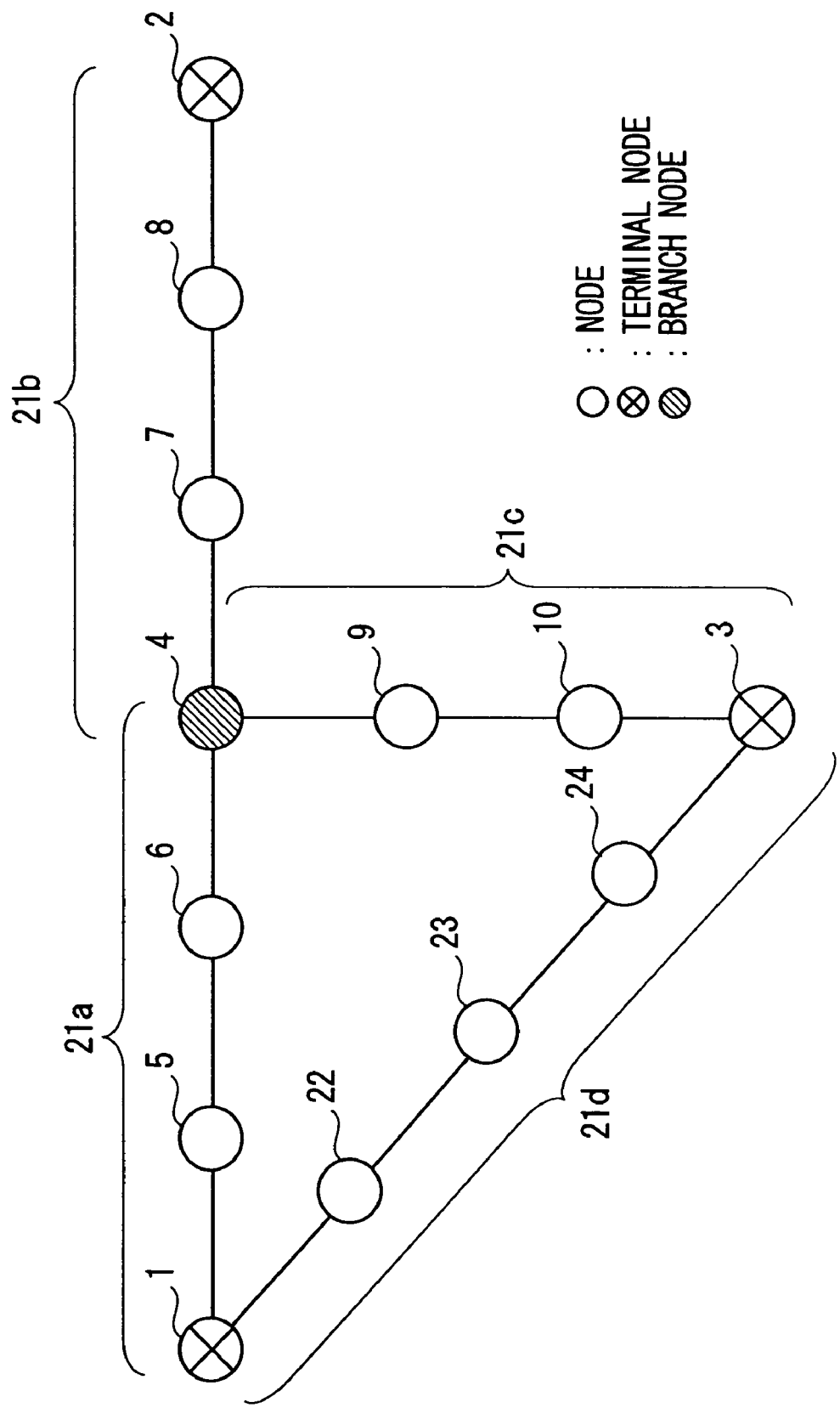
FIG. 15 is a diagram showing an example of a model of a network.

FIGS. 13 and 14 are flowcharts of the second operation example. FIG. 15 is a view showing a model of a network to be a target of the network design by the second operation example. Next, the second operation example of the network design device 13 according to the present invention will be described. The processing at S10 to S15 in the second operation example is the same as that at S02 to S07 in the first operation example. Hereinafter, differences of the second operation example from the first operation example will be described.

In the second operation example, a variable, that is, equipment cost, is used. In the second operation example, the topology information, the traffic demand information, and the signal performance information are input to the network designing device 13. In addition, a value of equipment cost is set to be infinite (S09). As the topology information, for example, information corresponding to the model of the network as shown in FIG. 15 is input. As the traffic demand information, information indicating that there is traffic demand for an optical path of one channel from the terminal node 1 to the terminal node 2 and an optical path of one channel from the terminal node 1 to the terminal node 3 is input.

Next, a path with the shortest distance is routed. An appropriate wavelength is assigned to the path in a link through which it passes (S10). In this case, the path passing through the nodes 22 to 24 is set as the path from the terminal node 1 to the terminal node 3. The path passing through the nodes 5 to 8 and the branch node 4 is set as the path from the terminal node 1 to the terminal node 2 as in the first operation example.

Next, a device for terminating one or more channels predestinated for use (in this example, all channels) is assigned to each of the nodes with a line degree of 1 or 3 or more (S11).

Next, the network to be a target of the network design is divided into one or more linear partial networks partitioned by the node with the line degree of 1 or 3 or more (S12). By the processing, the partial networks 21a, 21b, and 21d are set. The partial network 21d contains the nodes 22 to 24. In this description, it is supposed that a fiber used for the partial network 21d has poor quality, that is, has a large signal to noise ratio.

Next, the section design processing is executed by the section design section 19 (S13). At this time, a signal to noise ratio in each link (that is, a signal to noise ratio of each of the fibers between the adjacent nodes 1 to 8 and 22 to 24, respectively) is first obtained based on each of the input information. FIG. 16 is a table showing signal to noise ratios obtained for the respective links. Based on the table, a signal to noise ratio determination value in each 3R section is calculated by using Equations 1 and 2 to be 0.80. Thereafter, as the processing at S05, a linear repeater and a regenerative repeater are assigned to each node. In this case, the partial network 21c is not to be processed because it is not contained in the path set at S10.

Next, the regenerator arrangement change processing is executed by the regenerator arrangement change section 20 (S14 and S15). At the time when the processing at S15 is completed for the first time (at the time when it is determined that the processing for all the paths is completed at S15 for the first time), the linear repeaters are assigned to the nodes 5 and 8, whereas the regenerative repeaters are assigned to the nodes 6, 7, 22, 23, and 24.

Next, it is determined if equipment cost has been reduced (S16) Specifically, the equipment cost of the network designed at the time of determination at S16 is calculated. The calculated value and the value of equipment cost retained as a variable are compared with each other. The equipment cost is calculated by, for example, adding up the numerical values of cost set in the respective devices. If the newly calculated value is small, that is, the equipment cost is reduced (S16-YES), a new path is set (S17). Then, network design for this new path is executed (S11 to S15). In the first determination at S16, for example, the value of equipment cost retained as a variable is infinite. Therefore, the processing after S17 is (the processing for the second time or after) is necessarily executed.

In the second operation example shown in FIG. 15 for the network, a path passing through the nodes 5, 6, 9, and 10 and the branch node 4 is set as a path from the terminal node 1 to the terminal node 3 in the rerouting at S17. Thereafter, by the processing at S12 to S15, the regenerative repeater and the linear repeater are assigned to the nodes 9 and 10, respectively, whereas the regenerative repeaters assigned to the nodes 22 to 24 are deleted. Moreover, the regenerator 11 of the channel in the HUB, which corresponds to the path from the terminal node 1 to the terminal node 3, is also deleted.

After the above processing, the processing at S16 is executed again. In this case, two regenerative repeaters are deleted and one linear repeater is added. Herein, it is supposed that the cost of the regenerative repeater is higher than that of the linear repeater, and therefore, the equipment cost is reduced. Thus, the processing at S17 and S11 to S16 is executed. At this time, since no other path is present, the equipment cost is not reduced (S16-NO). Thus, a component list of the device (the linear repeater, the regenerative repeater, or the regenerator 11 in the HUB) assigned to each node is created and output (S18).

Figure 17:
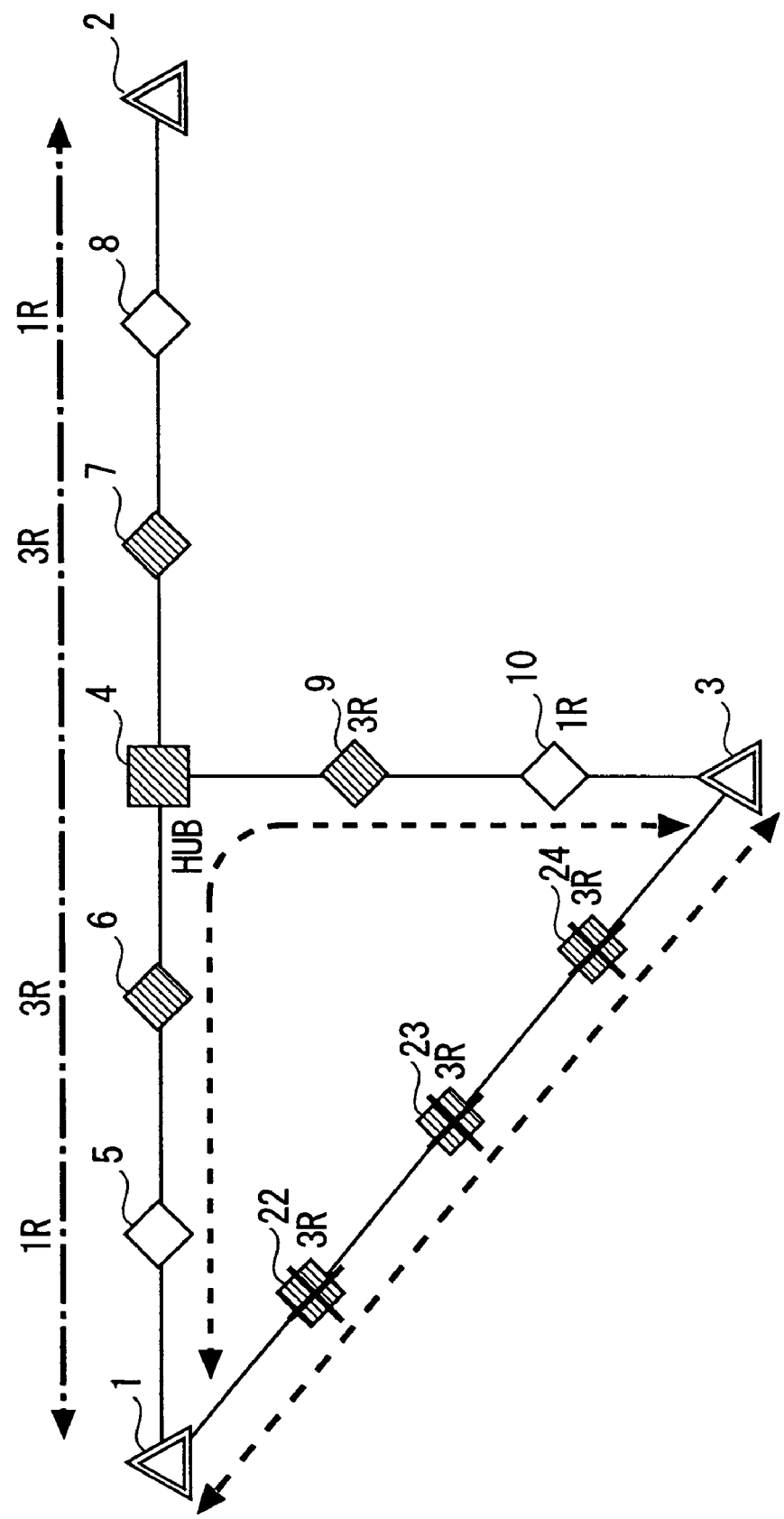
FIG. 17 is a diagram showing an example of design of a network.

FIG. 17 is a view showing an example of network design according to the second operation example. The regenerative repeaters at the nodes 22 to 24, which have been assigned through the design for the first time, are deleted in the design for the second time. As a result, the device assignment is the same as that in the network designed by the first operation example (see FIG. 12).

In the processing at S16 in the second operation example, it may be determined whether the processing at S11 to S15 has been executed for all the paths instead of determining whether the equipment cost is reduced or not. In this case, if there is a path which is not subjected to the processing at S11 to S15 yet, the processing at S11 to S15 is executed for the new path after the processing at S17. If the processing at S11 to S15 has been executed for all the paths, the processing at S18 is executed. In this case, the output based on the network design at the lowest equipment cost is performed.

Moreover, in the processing at S17 in the second operation example, the routing may be carried out so as to set a path with a shorter distance by priority. In this case, besides the reduction in equipment cost, the effects of enabling the setting of a path with a shorter distance are obtained.

[Functions and Effects of the Second Operation Example]

According to the second operation example, in the case where a plurality of paths can be set as a path from a certain transmitter node to a receiver node, the efficient assignment of a linear repeater and a regenerative repeater to each of the paths is executed while the regenerator 11 is deleted. Then, it is determined whether the equipment cost becomes lower than that in the previous network design or not. At the time when the reduction in cost is no more possible, output is performed. Therefore, even in a network in which a plurality of paths can be set, network design at lower equipment cost is made possible.

Second Embodiment

Next, the second embodiment of the present invention will be described. Since the second embodiment includes a common structure to the first embodiment, a structure different from that of the first embodiment will be mainly described.

According to the above-described first embodiment, equipment introduction cost can be reduced for the reduction of the regenerators (REG).

Figure 21:
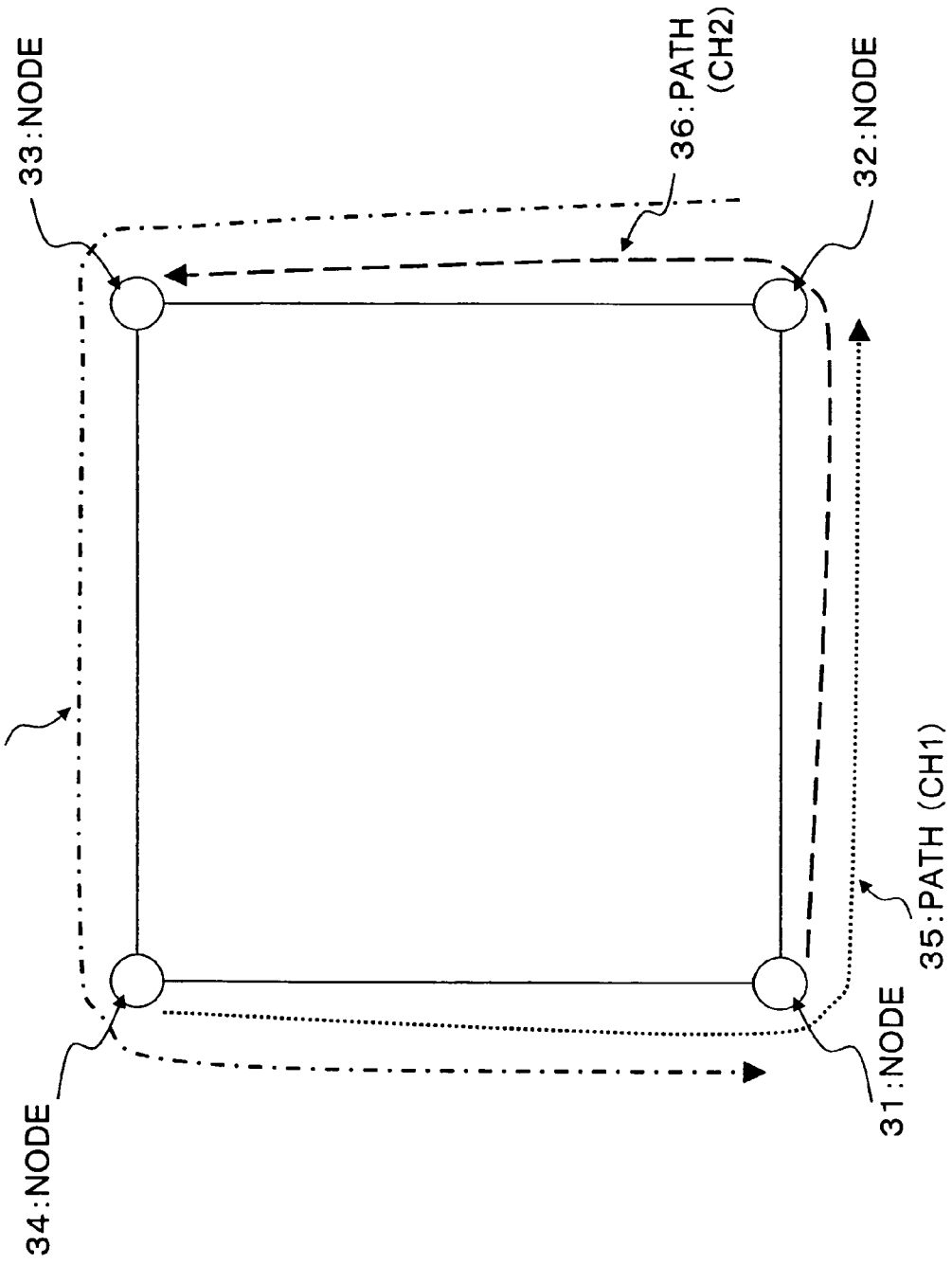
FIG. 21 is an explanatory diagram of collision of wavelengths.

However, if a traffic load is concentrated on the HUB node (the branch node), collision occurs in the channel (a wavelength or a frequency) of the consecutive paths. Therefore, there arises a need of channel conversion in any relay node in the path. For example, in FIG. 21, it is supposed that each fiber can use only a channel CH1 and a channel CH2 and there are a path 35 from a node 34 to a node 32, a path 36 from a node 31 to a node 33, and a path 37 from the node 32 to the node 31. If the CH1 is assigned to the path 35, the CH2 is necessarily assigned to the path 36. Similarly, the CH1 is assigned to the path 37 again. In this case, however, the collision of CH1 occurs in the fiber between the nodes 34 and 31. Therefore, it is necessary to convert the channel of the path 37 from the CH1 to the CH2 at the node 33 or the node 34.

For the channel conversion, a wavelength converter has been developed and the arrangement of the necessary minimum number of wavelength converters has been studied in the field of optical networks. As examples of the wavelength converter, there are wavelength converters as disclosed in JP 5-40287 A, JP 5-167166 A, and JP 5-241218 A.

If a regenerator (also denoted as "REG") is provided for a node in the communication network, the range of channels receivable by the REG in the optical-electric-optical (O-E-O) processing is large although the channels are limited. Specifically, even if an output channel of the provided REG is fixed, the channel conversion can be realized by changing the combination of an input channel and an output channel.

In this case, a REG introduced for a signal regeneration function and a REG introduced for realizing a channel conversion function are present at the same time in the communication network. At this time, the same type of REG is used even if the objects are different. Therefore, the reduction of the number of REGs by providing the REG with both the channel conversion function and the signal regeneration function is to be achieved for realizing a communication network at the minimum cost.

The second embodiment is devised in view of the above object, and arranges a regenerator so as to perform channel conversion in a site where a regenerator is indispensable for signal performance to reduce the cost of network construction if channel conversion is required on a path.

Figure 22:
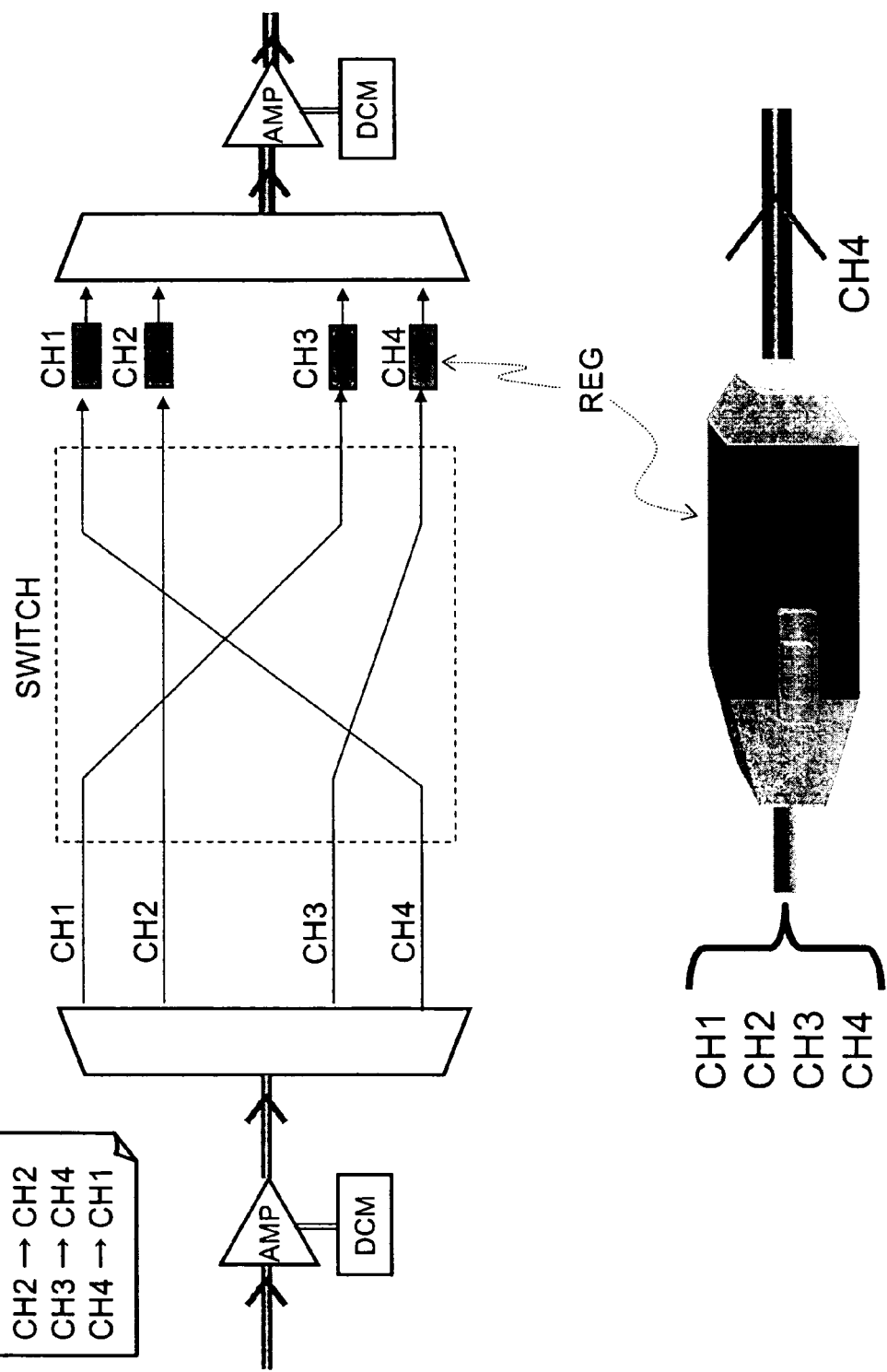
FIG. 22 is an explanatory diagram of channel conversion by the recombination of a regenerator (REG)

FIG. 22 shows a device for executing channel conversion by changing the combination of a REG. A multiplexed input signal passes through a signal amplifier (AMP) and a dispersion compensating module (DCM) to be separated into a plurality of channels (herein, four channels (CH1 to CH4) are assumed). The separated input channel is combined with (switched to) a REG provided for a corresponding output channel in accordance with the set contents of a channel conversion table. The change is executed by a switch. However, it can also be executed by manual setting with a panel or automatic setting with Micro-Electro-Mechanical Systems (MEMS). The REG provided for the output channel is capable of receiving any of CH1 to CH4 in this example, and an output is from one preset fixed channel (any of CH1 to CH4).

Figure 23:
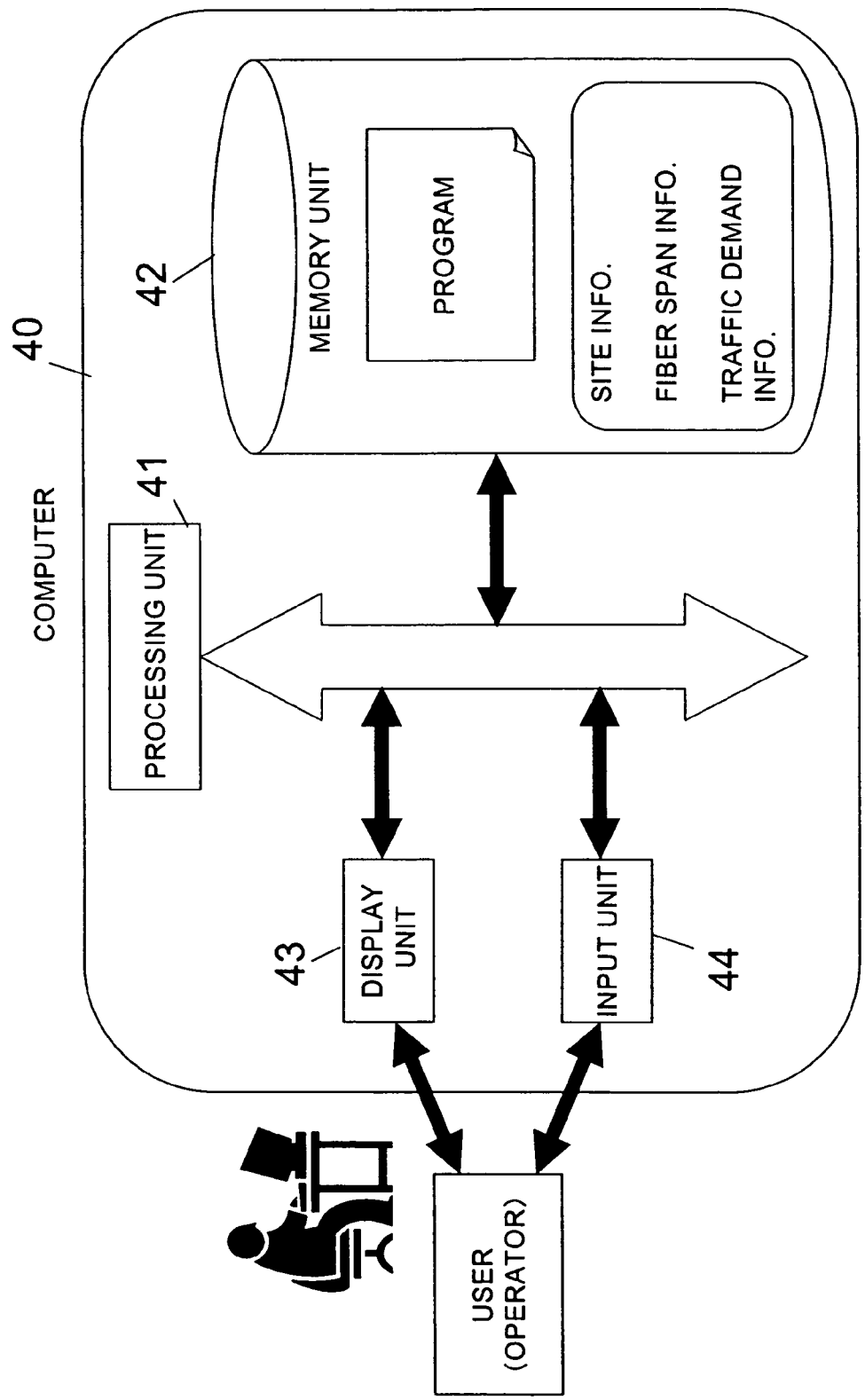
FIG. 23 is a diagram showing an example of a structure of a computer (information processing device) used in a second embodiment.

FIG. 23 is a configuration view of a communication network system designing method according to the second embodiment of the present invention. As shown in FIG. 23, the communication network system design is realized by a computer 40 such as a PC or a WS, including a processing unit 41, a memory unit 42, a display unit 43, and an input unit 44, or the like. A user or an operator enters site information, fiber span information, and traffic demand information to the input unit 44 through an input device such as a keyboard or a mouse. After being processed in the processing unit 41, information is stored in the memory unit 42. The memory unit 42 also stores a program constituting the main frame of the communication network system design. The processing unit 41 executes processing in accordance with the rules described in the program. The results of calculation are output to the user through the display unit 43.

By the operation of the processing unit 41 in accordance with the program, the section division unit, the section design unit, the channel assignment unit, and the adjustment unit according to the present invention are realized.

FIG. 24 is a view showing a data structure of site information and an example of the data. In FIG. 24, a "site ID" indicates a proper site identifier (a city name or the like) as the entire communication network, and "latitude" and "longitude" indicate a geographic coordinate of the site.

FIG. 25 is a view showing a data structure of fiber span information and an example of the data. A "span ID" indicates a proper identifier as the entire communication network, a "site ID1" indicates a connected site on the upstream side of a fiber span, a "site ID2" indicates a connected site on the downstream side of the fiber span, a "length" indicates a physical length of the fiber, and a "fiber type" indicates the type of fiber, which determines a characteristic such as signal degradation.

FIG. 26 is a view showing a data structure of traffic demand information and an example of the data. A "demand ID" indicates a proper identifier corresponding to each traffic demand, a "site ID1" indicates a traffic transmitter site identifier, a "site ID2" indicates a traffic receiver site identifier, a "bandwidth" indicates a bandwidth of a communication channel required by the traffic demand, and the "number of channels" indicates the number of actually set paths.

<Design Flow>

Figure 27:
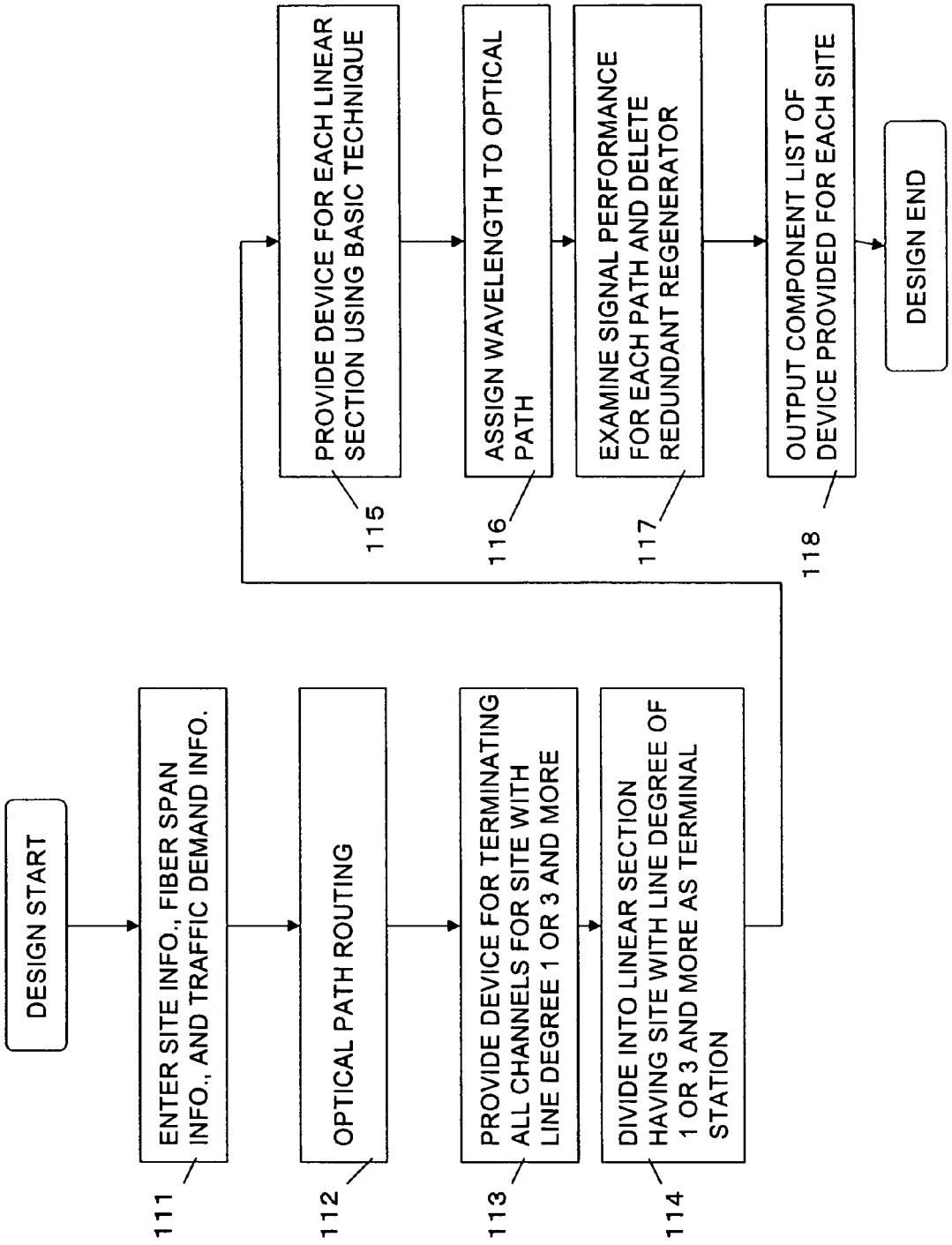
FIG. 27 is an explanatory diagram of a design flow in the second embodiment.

FIG. 27 shows a design flow of an optical (photonic) network. The flow is realized by the operation of the computer 40 (FIG. 23) by a user and the processing of the processing unit 41 in accordance with the program based on the operation.

At the start of design, the site information, the fiber span information, and the traffic demand information are input from the input unit 44 in processing 111.

In processing 112, an optical path is routed by the processing unit 41 based on the traffic demand to determine the number of channels included in each fiber.

In processing 113, the processing unit 41 provides a device (a terminal device) for terminating all channels for a site with a line degree (the number of site routes; the meaning is the same as in the first embodiment) equal to 1 or 3 or more as the preparation for processing 114.

In the processing 114, the processing unit 41 divides the network into linear design sections (referred to as a "section obtained by division", corresponding to the "partial network" in the first embodiment) including the site, in which the terminal device is provided in the processing 113, as a terminal station. By the processing 113 and 114, the function as the section division unit is realized.

In processing 115, the processing unit 41 provides equipment (a signal degradation compensating device) for compensating for signal performance in the units of multiplexing in the linear design section (the partial network) obtained by division. At this time, as in the first embodiment, the equipment arrangement based on the basic technique can be used. Therefore, as in the first embodiment, 1R and/or 3R are/is provided at a predetermined position between the terminal nodes. By the processing 115, the function as the section design section is realized.

In processing 116, after the combination of a plurality of sections obtained by divisions, the processing unit 41 assigns an available wavelength to a channel in the fiber on each optical path for each of the optical paths connecting the terminal devices in the network constituted by the combination of the sections obtained by divisions. At this time, if the same wavelength cannot be assigned in the fiber on the optical path, wavelength conversion (that is, channel conversion) is required. The wavelength conversion can be realized by changing the combination of the REG as shown in FIG. 22, that is, switching the input channel (the input wavelength) to a plurality of REGs for which the output channel (the output wavelength) is fixed. By the processing 116, the function as the channel assignment section is realized.

In processing 117, the processing unit 41 deletes a redundant REG used for the channel for each optical path. Specifically, the processing unit 41 examines signal performance at the removal of a REG to be a candidate for deletion. If it is determined that a signal is transmittable, the REG is deleted. Such processing is the same as that of the arrangement change section described in the first embodiment. Therefore, for example, a redundant REG is deleted from the HUB node. Moreover, the arrangement of the REG can be changed. However, if a REG to be deleted or whose arrangement is to be changed is used for wavelength conversion, the REG is not deleted even if it is determined that a signal is transmittable (the REG is not needed in view of signal performance). By the processing 117, the function as the adjustment section is realized.

Finally, in processing 118, the processing unit 41 reflects the result of REG deletion (adjustment) to output a component list of the device provided in each site, thereby terminating the design.

The processing flow shown in FIG. 27 is substantially the same as the design flow described in the first embodiment (see FIGS. 10 and 13). However, the assignment of a wavelength to the optical path is executed together with the optical path routing as at S02 (FIG. 10) or S10 (FIG. 13) in the first embodiment. In the second embodiment, however, it is executed after the arrangement of the device to the section obtained by division (the processing 116). The channel assignment is performed by using the regenerator provided for the optical path in view of the signal degradation compensation to execute necessary channel (wavelength) conversion, so that a common component have both the signal degradation compensation function and the channel conversion function.

However, in the first embodiment, the regenerator may be provided in view of signal degradation compensation after the assignment of the channel (the arrangement of the regenerator for channel conversion) at S02 or S10. Thereafter, the adjustment may be performed so that the arrangement of the regenerator becomes required minimum.

Hereinafter, several wavelength assignment methods suitable to be executed in the processing 116 will be described. However, the conditions described in the following wavelength assignment methods (in particular, the conditions for weighting) can be appropriately combined with each other.

<First Wavelength Assignment Method>

Figure 28:
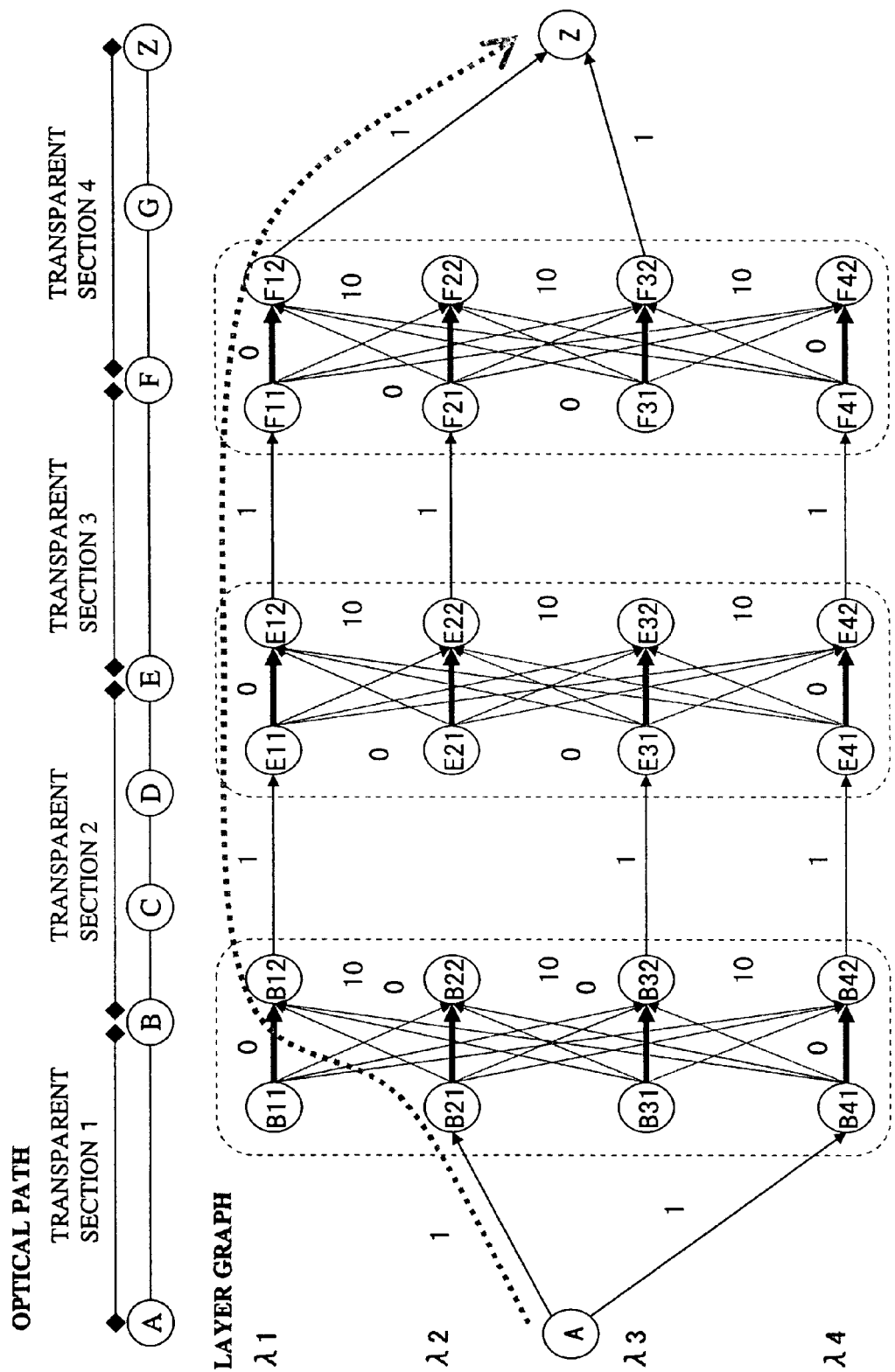
FIG. 28 is an explanatory diagram of wavelength assignment (a first wavelength assignment method) using a layer graph.

FIG. 28 is a layer graph which can be used for the wavelength assignment in the processing 116 in the design flow shown in FIG. 27 and an exemplary optical path corresponding to the layer graph.

As shown in FIG. 28, as an example, an optical path having a site A as a starting point, a site Z as a terminal point, and sites B, C, D, E, F, and G as relay sites is supposed. Such an optical path is an optical path extracted from those in a non-linear network as shown in FIG. 1 and corresponding to an exemplary one of a plurality of paths to be processed for each path in the processing 116.

It is supposed that a 3R including a REG is provided for each of the sites B, E, and F and a 1R merely for signal amplification is provided for each of the sites C, D, and G at present. Moreover, a section between the sites, in which a signal is regenerated by the REG, is defined as a "transparent section". As a result, the optical path shown in FIG. 28 is composed of transparent sections 1 to 4. Furthermore, it is supposed that a fiber span through which the optical path passes is capable of multiplexing four wavelengths, $\lambda 1$ to $\lambda 4$.

A method of constructing a layer graph is as follows. First, relay sites provided with the 3R are represented as vertexes. Then, the relay sites are divided into layers, each corresponding to a wavelength which can be multiplexed. Furthermore, the relay site is decomposed into vertexes representing an input and an output. In other words, the wavelengths which can be assigned to the respective channels (multiplexed) are represented in a layer structure while the input and output channels connectable to the respective regenerative amplifiers on the optical path are represented as the vertexes.

In the example shown in FIG. 28, the wavelengths (i.e., the channels) which can be used (multiplexed) on the optical path are four, $\lambda 1$ to $\lambda 4$. The wavelengths $\lambda 1$ to $\lambda 4$ are represented in a layer structure. Then, the input and output channels corresponding to $\lambda 1$ to $\lambda 4$, which are connected to the regenerative amplifiers of the respective relay sites B, E, and F, are represented as vertexes.

For example, for the site B, B11 is an input vertex and B12 is an output vertex in a layer corresponding to the wavelength $\lambda 1$. As in the same manner as the wavelength $\lambda 1$, vertexes B21, B22, B31, B32, B41, and B42 are created for $\lambda 2$ to $\lambda 4$. The same processing as that for the site B is performed for the sites E and F. However, the starting point A and the terminal point Z are not divided. However, they can be treated similarly to the relay sites.

For the vertexes indicating the same site, directed edges are generated from the input vertexes to the output vertexes in all the layers. At this time, the directed edge connecting the vertexes in the same layer to each other is defined as a first horizontal edge, whereas the directed edge connecting the vertexes in different layers to each other is defined as a vertical edge. At this time, the edge extending across different layers (the vertical edge) is weighted with a weight, for example, "10", whereas the edge in the same layer (the first horizontal edge) is weighted with a weight "0". This is for giving a penalty in the case where the wavelength conversion takes place. The first horizontal edge corresponds to a first link, whereas the vertical edge corresponds to a second link.

Next, in each of the layers, directed edges are generated from the output vertexes corresponding to the relay sites provided with the 3R to the input vertexes, only if the wavelengths can be assigned to the transparent sections. Then, these directed edges are defined as second horizontal edges. Specifically, the directed edges corresponding to the channels in the layer available between transparently adjacent regenerative amplifiers are generated as the second horizontal edges.

In the example in FIG. 28, it is supposed that the wavelengths $\lambda 2$ and $\lambda 4$ can be assigned (allocated) to the transparent section 1, the wavelengths $\lambda 1$, $\lambda 3$, and $\lambda 4$ can be assigned to the transparent section 2, the wavelengths $\lambda 1$, $\lambda 2$, and $\lambda 4$ can be assigned to the transparent section 3, and the wavelengths $\lambda 1$ and $\lambda 3$ can be assigned to the transparent section 4. Therefore, for example, between the relay sites B-D, the second horizontal edges are respectively generated between B12-E11, between B32-E31, and between B42-E41, which correspond to $\lambda 1$. Each of the second horizontal edges is weighted with a weight larger than that of the first horizontal edge but smaller than the vertical edge, for example, a weight "1". Such the second horizontal edge corresponds to a third link.

Furthermore, directed edges are generated under the same conditions as those for the second horizontal edges between the starting point of the optical path and the regenerative amplifier (the relay site; in this case, the site B) situated immediately after the starting point and between the terminal point of the optical path and the regenerative amplifier (the relay site; in this case, the site F) situated immediately before the terminal point, respectively. These directed edges can be defined as a third horizontal edge and a fourth horizontal edge, respectively. The third and fourth horizontal edges correspond to a fourth link and a fifth link, respectively. The third and fourth horizontal edges are weighted with the same weight "1" as that of the second horizontal edge.

On the layer graph generated as described above, the shortest route search (for example, various existing shortest route search algorisms such as a Dijkstra technique can be used. The same can be applied to the following second to fourth methods) from the vertex A to the vertex Z is made. As a result, the result of wavelength assignment, that is, $\lambda 2$ to the transparent section 1, $\lambda 1$ to the transparent section 2, $\lambda 1$ to the transparent section 3, and $\lambda 1$ to the transparent section 4, can be obtained. Such results of the wavelength assignment can keep the movement between the layers (specifically, the channel conversion) to the minimum. Specifically, according to the first wavelength assignment method, the minimization of the frequency of wavelength conversion can be realized.

[Second Wavelength Assignment Method]

Figure 29:
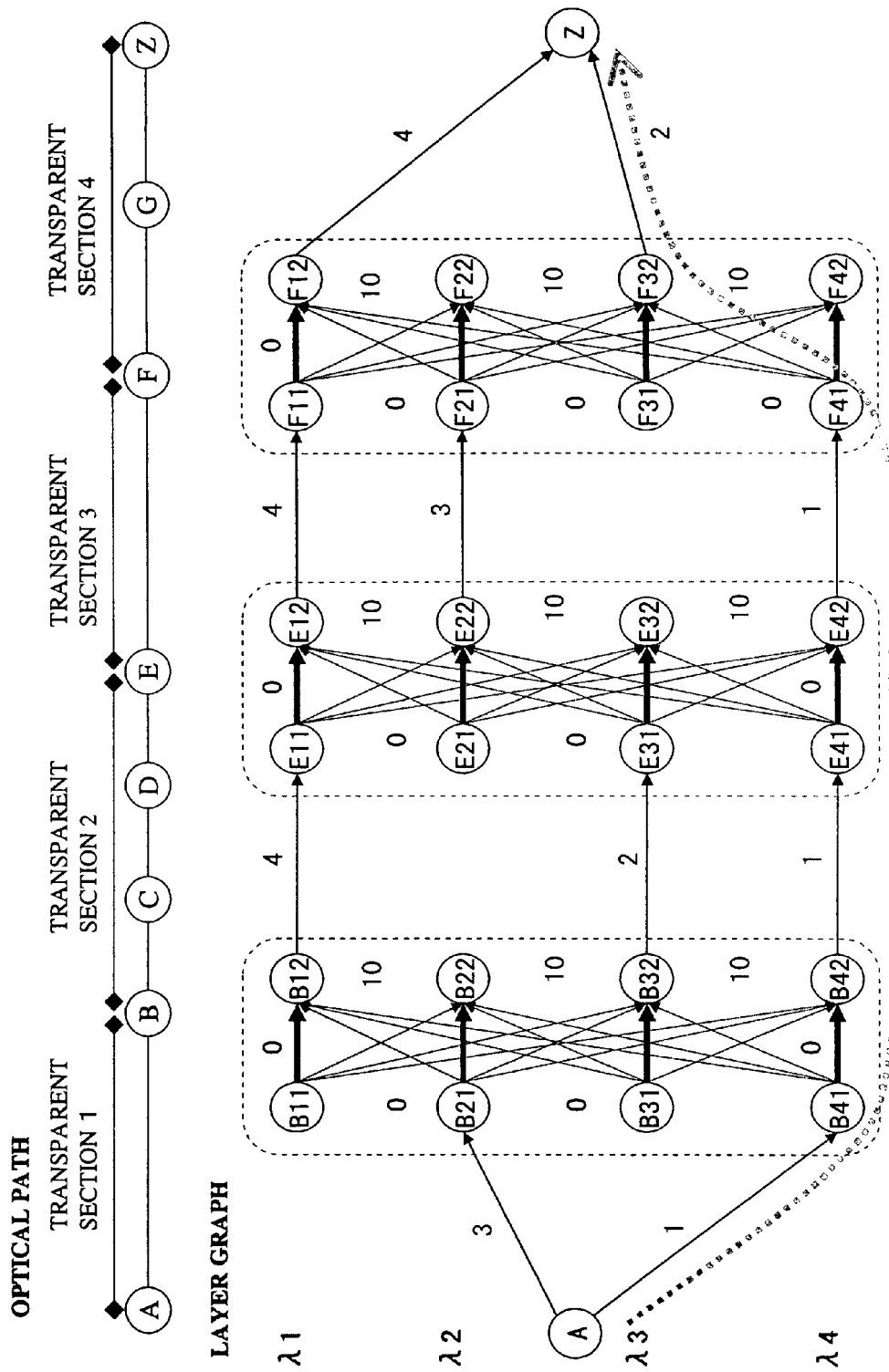
FIG. 29 is an explanatory diagram of wavelength assignment (a second wavelength assignment method) using a layer graph in consideration of the priority of use of a wavelength.

FIG. 29 is a layer graph, which can be used in the processing 116 in FIG. 27, is created in the second wave length assignment method, and can be used for wavelength assignment with the minimum frequency of wavelength conversion, and an exemplary optical path corresponding to the layer graph.

In FIG. 29, a structure of the optical path supposed for creating the layer graph is the same as the optical path (FIG. 28) supposed in the first wavelength assignment method. It is now supposed that higher priority is given to $\lambda 4$, $\lambda 3$, $\lambda 2$, and $\lambda 1$ in this order for the use of wavelengths. The priority for wavelengths can be appropriately preset by a network administrator or the like.

In this case, the horizontal edges in the layers corresponding to the wavelengths (the second to fourth horizontal edges) are weighted so as to reflect the priority. Specifically, a smaller weight is given as the priority given to the wavelength becomes higher. For example, a weight "4" is given to $\lambda 1$, a weight "3" is given to $\lambda 2$, a weight "2" is given to $\lambda 3$, and a weight "1" is given to $\lambda 4$ for the second to fourth horizontal edges. Otherwise, the layer graph is generated under the same conditions as those of the first wavelength assignment method.

On the layer graph generated as described above, the shortest route search from the vertex A to the vertex Z is made. As a result, the results of wavelength assignment, $\lambda 4$ to the transparent section 1, $\lambda 4$ to the transparent section 2, $\lambda 4$ to the transparent section 3, and $\lambda 3$ to the transparent section 4, are obtained. In this manner, according to the second wavelength assignment method, different results can be obtained from those of the first wavelength assignment method although the structure of the layer graph is the same. Therefore, according to the second wavelength assignment method, the wavelength assignment in consideration of the priority of the use of wavelengths can be realized while minimizing the frequency of wavelength conversion. In other words, the order of use of the wavelengths (the channels) can be controlled.

[Third Wavelength Assignment Method]

Figure 30:
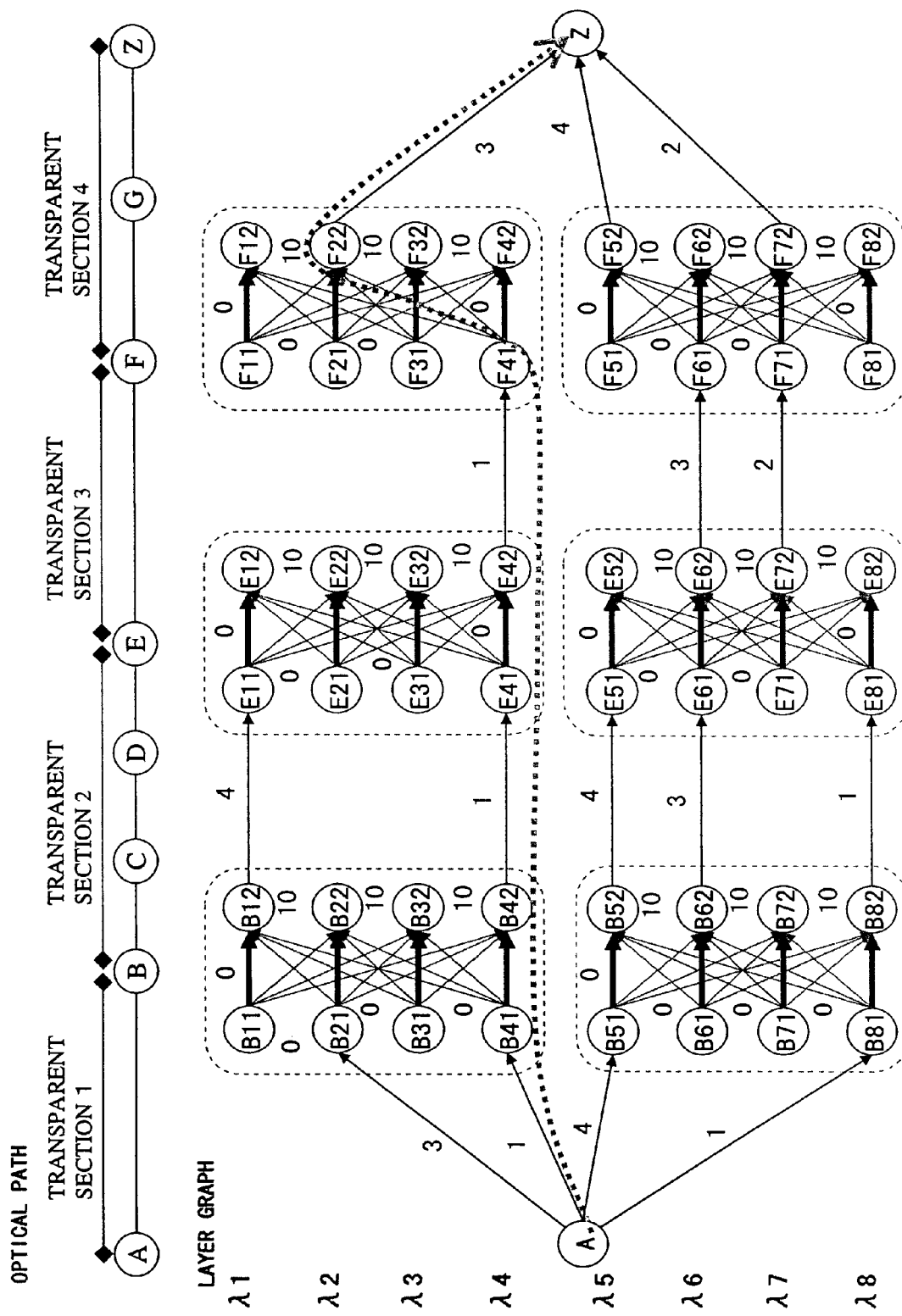
FIG. 30 is an explanatory diagram of wavelength assignment (a third wavelength assignment method) using a layer graph in the case where there are restrictions on wavelength conversion in a regenerative amplifier.

FIG. 30 is a layer graph, which can be used in the processing 116 in FIG. 27, is created in the third wavelength assignment method, and can be used for wavelength assignment with the minimum frequency of wavelength conversion, and an exemplary optical path corresponding to the layer graph.

A structure of the optical path supposed for creating the layer graph shown in FIG. 30 is the same as the optical paths (FIGS. 28 and 29) supposed in the first and second wavelength assignment methods. However, eight wavelengths from $\lambda 1$ to $\lambda 8$ can be multiplexed in the fiber span through which the optical path passes.

In FIG. 30, it is supposed that it is possible to assign the wavelengths $\lambda 2$, $\lambda 4$, $\lambda 5$, and $\lambda 8$ to the transparent section 1, the wavelengths $\lambda 1$, $\lambda 4$, $\lambda 5$, $\lambda 6$, and $\lambda 8$ to the transparent section 2, the wavelengths $\lambda 4$, $\lambda 6$, and $\lambda 7$ to the transparent section 3, and the wavelengths $\lambda 2$, $\lambda 5$, and $\lambda 7$ to the transparent section 4 as wavelengths which can be assigned to the respective transparent sections. For weighting reflecting the priority to the horizontal edges, $\lambda 1$ and $\lambda 5$ are weighted with "4", $\lambda 2$ and $\lambda 6$ with "3", $\lambda 3$ and $\lambda 7$ with "2", and $\lambda 4$ and $\lambda 8$ with "1".

Herein, it is supposed that, for example, mutual conversion is possible only from the wavelength $\lambda 1$ to $\lambda 4$ and from the wavelength $\lambda 5$ to $\lambda 8$ in consideration of the restrictions on the wavelength conversion in the regenerative amplifiers in the relay sites (the sites B, E, and F) provided with the 3R. At this time, the vertical edge form the input vertex to the output vertex corresponding to each site is generated only for the combination for which the conversion is possible. Otherwise, the layer graph is created under the same conditions as those of the second wavelength assignment method.

The shortest route search from the vertex A to the vertex Z is made on the layer graph created under the above conditions. As a result, the results of wavelength assignment, $\lambda 4$ to the transparent section 1, $\lambda 4$ to the transparent section 2, $\lambda 4$ to the transparent section 3, and $\lambda 2$ to the transparent section 4, are obtained.

In this manner, according to the third wavelength assignment method, even if there are restrictions on the optical path for wavelength conversion, the wavelength assignment in consideration of the priority of the use of wavelengths can be realized while taking the restrictions for wavelength conversion into account and minimizing the frequency of wavelength conversion.

[Fourth Wavelength Assignment Method]

FIG. 31 is a layer graph, which can be used in the processing 116 in FIG. 27, is created in the fourth wavelength assignment method, and can be used for wavelength assignment with the minimum frequency of wavelength conversion, and an exemplary optical path corresponding to the layer graph. An example of the optical path with the application of the fourth wavelength assignment method has the same structure as that of the optical paths in the first to third methods.

It is now supposed that cumulative normalized noise in each site is taken as an example of signal performance and the cumulative normalized noise in the respective relay sites are 0.90 in the site B, 0.85 in the site E, and 0.60 in the site F. Furthermore, it is supposed that a determination value of a noise quality on the basis of the entire section is 1.00. A value obtained by multiplying a difference between the determination value and each cumulative normalized noise by 100 is given as a weight on the vertical edge in each site. Specifically, the vertical edge in the site B is weighted with:

$$(1.00-0.90) \times 100=10$$

The vertical edge in the site E is weighted with:

$$(1.00-0.85) \times 100=15$$

The vertical edge in the site F is weighted with:

(1.00−0.60)×100=40

Otherwise, the layer graph is created under the same conditions as those of the third wavelength assignment method.

Besides the normalized noise, a level diagram, a dispersion map, a dispersion slope map, a crosstalk, a polarization mode dispersion, the number of filters, the number of spans, the number of amplifiers, the lower limit of dispersion tolerance, the upper limit of dispersion tolerance, the minimum cumulative dispersion, the maximum cumulative dispersion, a lower dispersion margin, and an upper dispersion margin can be used as signal performance parameters to be taken into consideration. Furthermore, the combination of a plurality of the above-described signal performance parameters can also be used.

The shortest route search from the vertex A to the vertex Z is made on the layer graph created under the above conditions. As a result, the results of wavelength assignment, $\lambda 8$ to the transparent section 1, $\lambda 8$ to the transparent section 2, $\lambda 7$ to the transparent section 3, and $\lambda 7$ to the transparent section 4, are obtained.

According to the fourth wavelength assignment method, the results of wavelength assignment different from those of the third wavelength assignment method can be obtained even though the structure of the layer graph is the same and the cumulative weights on the horizontal edges are the same. Therefore, according to the fourth wavelength assignment method, the wavelength assignment in consideration of the priority of the use of wavelengths can be realized while performing wavelength conversion as much as possible in a site with poor signal performance, taking the restrictions for wavelength conversion into account, and minimizing the frequency of wavelength conversion.

According to the above-described present invention, an efficient and economical communication network system can be quickly realized for a mesh type communication network. Therefore, it is practically remarkably useful. Specifically, since the equipment introduction cost and the equipment maintenance cost of a transmission system network and the number of steps of communication network design can be reduced by the present invention, operation cost by a system operator can be remarkably reduced.

INDUSTRIAL APPLICABILITY

The present invention can be used for the industrials for providing service for network design with equipment cost being kept down.

[Others]

The disclosures of international application PCT/JP2003/012510 filed on Sep. 30, 2003 including the specification, drawings and abstract are incorporated herein by reference.

What is claimed is

1. A network design device comprising:
a division unit for dividing a network having a plurality of channels, branch nodes, and paths into a plurality of linear partial networks using a predetermined terminal node or each branch node as the terminal nodes by provisionally allocating a device terminating one or more channels to be used to the terminal node and each branch node;
an allocation unit for allocating one of a linear relay device and a reproduction relay device to a node constituting each of the partial networks according to signal performance of a fiber allocated between the nodes;
a path formation unit for forming a particular path by combining the partial networks to which one of the linear relay device and the reproduction relay device has been allocated by the allocation unit; and
a deletion unit for deleting the device terminating the channel provisionally allocated to the branch node for each path formed by the path formation unit according to the signal performance.

2. The network design device according claim 1 further comprising a channel assignment unit for routing a path and assigning channels to a routed path based on a traffic demand between the nodes, wherein:
the division unit creates a partial network based on the path routed by the channel assignment unit; and
the path formation unit forms the path routed by the channel assignment unit as a specific path.

3. The network design device according to claim 2 further comprising a continuation determination unit for determining whether or not to continue processing after the processing by the deletion unit, wherein:
the channel assignment unit routes a new path if the continuation determination unit determines to continue the processing; and
the division unit, the assignment unit, the path formation unit and the deletion unit execute processing for the path newly routed by the channel assignment unit.

4. The network design device according to claim 3, wherein the channel assignment unit makes a search for an available path based on signal performance from a current installation state of communication network equipment when a new path is to be routed.

5. The network design device according to claim 3, wherein the continuation determination unit determines to continue the processing if equipment cost in a newly designed network is lower than that in the previously designed network.

6. The network design device according to claim 3, wherein the continuation determination unit determines to continue the processing if an unset path is present.

7. The network design device according to claim 1, wherein the division unit does not constitute a partial network including a branch node having two connection routes as a terminal node.

8. The network design device according to claim 1, wherein for the path formed by the path formation unit, from the terminal node or the node to which the regenerative repeater is assigned, if there is a branch node in an section to the other terminal node or the node to which the regenerative repeater is assigned at which the cumulative value of the degradation of signal performance from this node becomes maximum without exceeding a specific defined value, the deletion unit deletes the device for terminating the channel, which is assigned to the branch node.

9. The network design device according to claim 1 further comprising an output unit for performing output indicating one of the linear relay device and the reproduction relay device allocated to each node after processing by the deletion unit.

10. A computer recording medium embodied, a computer program for controlling, an information processing device to execute the steps of:
dividing a network having a plurality of channels and branch nodes into a plurality of linear partial networks using a predetermined terminal node or each branch node as the terminal nodes by provisionally allocating a device terminating one or more channels to be used to the terminal node and each branch node;

allocating one of a linear relay device and a reproduction relay device to a node constituting each of the partial networks according to signal performance;

forming a particular path by combining the partial networks to which one of the linear relay device and the reproduction relay device has been allocated; and deleting the device terminating the channel provisionally allocated to the branch node for each path formed according to the signal performance.

11. A branch device operating as a branch node constituting a network in which a device terminating a channel is deleted, which is designed by the steps of:

dividing a network having a plurality of channels and branch nodes into a plurality of linear partial networks using a predetermined terminal node or each branch node as the terminal nodes by provisionally allocating a device terminating one or more channels to be used to the terminal node and each branch node;

allocating one of a linear relay device and a reproduction relay device to a node constituting each of the partial networks according to the signal performance;

forming a particular path by combining the partial networks to which one of the linear relay device and the reproduction relay device has been allocated; and deleting the device terminating the channel provisionally allocated to the branch node for each path formed according to the signal performance.

12. A network system designed by a network design device comprising:

a division unit for dividing a network having a plurality of channels, branch nodes, and paths into a plurality of linear partial networks using a predetermined terminal node or each branch node as the terminal nodes by provisionally allocating a device terminating one or more channels to be used to the terminal node and each branch node;

an allocation unit for allocating one of a linear relay device and a reproduction relay device to a node constituting each of the partial networks according to signal performance of a fiber allocated between the nodes;

a path formation unit for forming a particular path by combining the partial networks to which one of the linear relay device and the reproduction relay device has been allocated by the allocation unit; and a deletion unit for deleting the device terminating the channel provisionally allocated to the branch node for each path formed by the path formation unit according to the signal performance.

* * * * *